(12) United States Patent
Sayyadi et al.

(10) Patent No.: US 11,244,017 B2
(45) Date of Patent: *Feb. 8, 2022

(54) CONTENT RECOMMENDATION SYSTEM WITH WEIGHTED METADATA ANNOTATIONS

(71) Applicant: Comcast Cable Communications, LLC, Philadelphia, PA (US)

(72) Inventors: Hans Sayyadi, Washington, DC (US); Oliver Jojic, Annandale, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/218,002

(22) Filed: Dec. 12, 2018

(65) Prior Publication Data

US 2019/0286673 A1   Sep. 19, 2019

Related U.S. Application Data

(63) Continuation of application No. 15/357,722, filed on Nov. 21, 2016, now Pat. No. 10,191,990.

(51) Int. Cl.
*G06F 16/9535*   (2019.01)
*G06F 16/40*   (2019.01)
(Continued)

(52) U.S. Cl.
CPC .......... *G06F 16/9535* (2019.01); *G06F 7/026* (2013.01); *G06F 16/40* (2019.01); *H04N 21/231* (2013.01); *H04N 21/25* (2013.01)

(58) Field of Classification Search
CPC ............... G06F 17/30867; G06F 7/026; G06F 17/30017; G06F 16/9535; G06F 16/40; H04N 21/25; H04N 21/231
(Continued)

(56) References Cited

U.S. PATENT DOCUMENTS 6,694,311 B1    2/2004  Smith
7,046,248 B1 *  5/2006  Perttunen ............... G06F 3/0481
                                                    345/440
(Continued)

FOREIGN PATENT DOCUMENTS

WO        2011034955 A2      3/2011

OTHER PUBLICATIONS

Juk, 15, 2020EPOPatentAppl17-202-818-5Refused (Year: 2020).*
(Continued)

*Primary Examiner* — Kuen S Lu
(74) *Attorney, Agent, or Firm* — Banner & Witcoff, Ltd.

(57) ABSTRACT

Systems and methods are described for improving content classifications and metadata for a plurality of content items. The content items may comprise various forms of media content. A content recommendation processing system may automatically annotate and/or classify content items with a plurality of metadata tag information describing content items. The disclosed system and methods may also determine and/or assign applicability scores indicating a level or degree of suitability for annotating a content item with particular metadata tag information, and may utilize applicability scores to provide content to calibrate metadata information for a plurality of content items, and further to provide content recommendations to users.

21 Claims, 9 Drawing Sheets

(51) Int. Cl.
    *G06F 7/02* (2006.01)
    *H04N 21/231* (2011.01)
    *H04N 21/25* (2011.01)
(58) Field of Classification Search
    USPC .......................................................... 707/749
    See application file for complete search history.

(56) References Cited

U.S. PATENT DOCUMENTS

| | | | |
|---|---|---|---|
| 7,272,593 | B1 | 9/2007 | Castelli et al. |
| 7,526,458 | B2 | 4/2009 | Flinn et al. |
| 8,620,919 | B2 | 12/2013 | Gates et al. |
| 8,694,457 | B2 | 4/2014 | Flinn et al. |
| 8,843,430 | B2 | 9/2014 | Jojic et al. |
| 9,473,730 | B1 | 10/2016 | Roy et al. |
| 9,692,778 | B1 | 6/2017 | Mohanty |
| 2003/0218696 | A1 | 11/2003 | Bagga et al. |
| 2005/0165782 | A1 | 7/2005 | Yamamoto |
| 2007/0028266 | A1 | 2/2007 | Trajkovic et al. |
| 2009/0012965 | A1 | 1/2009 | Franken |
| 2009/0083251 | A1 | 3/2009 | Sahasrabudhe et al. |
| 2009/0100094 | A1 | 4/2009 | Verdaguer et al. |
| 2009/0217804 | A1* | 9/2009 | Lu .......................... G06F 16/686 84/602 |
| 2010/0050202 | A1* | 2/2010 | Kandekar .......... H04N 21/4756 725/14 |
| 2010/0332440 | A1 | 12/2010 | Brodsky |
| 2010/0332568 | A1* | 12/2010 | Morrison ............. G11B 27/034 707/912 |
| 2012/0158743 | A1 | 6/2012 | Gardner et al. |
| 2012/0290518 | A1 | 11/2012 | Flinn et al. |
| 2012/0297038 | A1 | 11/2012 | Mei et al. |
| 2013/0103634 | A1 | 4/2013 | Jojic et al. |
| 2013/0117147 | A1 | 5/2013 | Ackerman et al. |
| 2014/0108316 | A1 | 4/2014 | Goldman |
| 2014/0164401 | A1 | 6/2014 | Kyaw et al. |
| 2015/0273336 | A1* | 10/2015 | Schmitt .................... A63F 13/49 463/31 |
| 2016/0154887 | A1 | 6/2016 | Zhao |
| 2016/0308944 | A1* | 10/2016 | Zhang ................. H04L 67/1095 |
| 2017/0287044 | A1 | 10/2017 | Rose et al. |

OTHER PUBLICATIONS

Jul. 15, 2020—European Decision to Refuse—EP 17202818.5.
U.S. Pat. No. 8,843,430, Recommendation System, Oct. 11, 2020.
U.S. Pat. No. 10,191,949, Recommendation System Using a Transformed Similarity Matrix, Jun. 15, 2018.
U.S. Pat. No. 10,191,990, Content Recommendation System With Weighted Metadata Annotations, Nov. 16, 2021.
Aug. 2, 2019—European Office Action—EP 17202818.5.
Extended European Search Report—EP 12189192.3—dated Feb. 12, 2013.
Ahn, "A new similarity measure for collaborative filtering to alleviate the new user cold-starting problem," Information Sciences, 2008. 178(1): pp. 37-51.
Anand and Bharadwaj, "Utilizing various sparsity measures for enhancing accuracy of collaborative recommender systems based on local and global similarities," Expert Systems with Applications, 2011. 38(5), pp. 5101-5109.
Apache Foundation. Available from: http://mahout.apache.org/, pp. 1-3.
Bambini et al., "A Recommender System for an IPTV Service Provider: a Real Large-Scale Production Environment," Recommender Systems Handbook, 2011: p. 299-331. (I see pp. 1-16.).
Cantador et al., "Content-based recommendation in social tagging systems," Recommender Systems. 2010, Sep. 26-30, 2010, pp. 1-4.
Fu and Leng, "A Framework for Recommender Systems in E-Commerce Based on Distributed Storage and Data-Mining," 2010 International Conference on E-Business and E-Government, 2010, pp. 3502-3505.

Adomavicius and Tuzhilin, "Toward the Next Generation of Recommender Systems: A Survey of the State-of-the-Art and Possible Extensions," IEEE Transactions on Knowledge and Data Engineering, Jun. 2005. 17(6): p. 734-749.
Gong, "An Efficient Collaborative Recommendation Algorithm Based on Item Clustering," Advances in Wireless Networks and Information Systems, 2010. 72, pp. 381-387.
GroupLens Research. Available from: http://www.grouplens.org/node/12, pp. 1-3.
Gunawardana and Shani, "A Survey of Accuracy Evaluation Metrics of Recommendation Tasks," The Journal of Machine Learning Research, 2009. 10, pp. 2935-2962.
Herlocker et al., "Evaluating collaborative filtering recommender systems," ACM Transactions on Information Systems (TOIS), Jan. 2004. 22(1), pp. 5-53.
Jiang and Wang, "Pagerank-Based Collaborative Filtering Recommendation," Information Computing and Applications, 2010. 6377, pp. 597-604.
Karypis, "Evaluation of Item-Based Top-N Recommendation Algorithms," Proceedings of the tenth international conference on Information and knowledge management. 2001, pp. 1-8.
Koren, "Factorization meets the neighborhood: a multifaceted collaborative filtering model," Proceeding of the 14th ACM SIGKDD international conference on Knowledge discovery and data mining. 2008, pp. 1-9.
Lekakos and Caravelas, "A hybrid approach for movie recommendation," Multimedia Tools and Applications, 2008. 36(1-2): p. 55-70.
Liang et al. "Collaborative Filtering Recommender Systems Using Tag Information," International Conference on Web Intelligence and Intelligent Agent Technology 2008, pp. 59-62.
Melville and Sindhwani, "Recommender Systems," Encyclopedia of Machine Learning, 2010, Chapter No. 00338, pp. 1-9.
Miller et al., "MovieLens unplugged: experiences with an occasionally connected recommender system," Proceedings of the 8th international conference on Intelligent user interfaces. Jan. 12-15, 2003, pp. 263-266.
Musto, "Enhanced vector space models for content-based recommender systems," Recommender Systems. Sep. 26-30, 2010, pp. 361-364.
Ormándi et al., "Overlay Management for Fully Distributed User-Based Collaborative Filtering," Lecture Notes in Computer Science, 2010. 6271-6282.
Resnick and Varian, "Recommender systems," Communications of the ACM, 1997. 40(3), pp. 56-58.
Sarwar et al. "Item-based collaborative filtering recommendation algorithms," Proceedings of WWW '01 Proceedings of the 10th international conference on World Wide Web. May 1-5, 2001, pp. 285-295.
Schlieder, "Modeling Collaborative Semantics with a Geographic Recommender," Advances in Conceptual Modeling—Foundations and Applications, Nov. 6-9, 2007. 4802-4812.
Su and Khoshgoftaar, "A survey of collaborative filtering techniques," Advances in Artificial Intelligence, 2009.
Töscher et al., "Improved neighborhood-based algorithms for large-scale recommender systems," Proceedings of the 2nd KDD Workshop on Large-Scale Recommender Systems and the Netflix Prize Competition. Aug. 24, 2008, pp. 1-6.
Wang et al., "Probabilistic relevance ranking for collaborative filtering," Information Retrieval, 2008. 11(6), pp. 1-27.
Zhao and Shang, "User-based collaborative-filtering recommendation algorithms on hadoop," Third International Conference on Knowledge Discovery and Data Mining. 2010, pp. 478-481.
Jojic et. al., "A Probabilistic Definition of Item Similarity," RecSys '11 Proceedings of the Fifth ACM Conference on Recommender Systems, Oct. 23-27, 2011, pp. 229-236, ACM New York, NY, USA.
Deshpande, M. et al. Item-based top-N recommendation algorithms, ACM Transactions on Information Systems, vol. 22, No. 1 (Jan. 2004), pp. 143-177.
Papagelis et al. "Qualitative analysis of user-based and item-based prediction algorithms for recommendation agents". Engineering Applications of Artificial Intelligence vol. 18 No. 7 (2005) pp. 781-789.

(56) References Cited

OTHER PUBLICATIONS

"Getting Started—DeepLearning 0.1 documentation", Deeplearning.net, retrieved on Jan. 23, 2015 from <http://deeplearning.net/tutorial/gettingstarted.html#opt-sgd>.

"Symmetric Matrix", Wikipedia, retrieved on Feb. 13, 2015 from <http://en.wikipedia.org/wiki/Symmetric_matrix>.

Ashutosh Saxena et al., "Non-linear Dimensionally Reduction by Locally Linear Isomaps", Indian Institute of Technology Kanpur, 2004.

Carl D. Meyer, "Martix Analysis and Applied Llinear Algebra", SIAM, Apr. 19, 2000.

Francesco Ricci, "Part 13: Item-to-Item Collaborative Filtering and Matrix Factorization", retrieved Feb. 13, 2015.

Kirk Baker, "Singular Value Decomposition Tutorial", Mar. 29, 2005.

Io (post author), "Differences between the L1-norm and the L2-norm (Least Absolute Deviations and Least Squares)", Garbled Notes: Things I Left Hanging Around, Dec. 3, 2013. Retrieved on Mar. 12, 2015 from <http://www.chioka.in/differences-between-the-l1-norm-and-the-l2-norm-least-absolute-deviations-and-least-squares/>.

Ryan Tibshirani, "Modem regression 1: Ridge regression", Mar. 19, 2013.

Vered Kunik, "Item Based Collaborative filtering Recommendation Algorithms".

Yifan Hu et al., "Collaborative Filtering for Implicit Feedback Datasets", Data Mining, 2008.

European Office Action—EP Appl. 12189192.3—dated Mar. 3, 2016.

Jan. 16, 2018—European Office Action—EP 12189192.3.

Feb. 28, 2018—Extended European Search Report—17202818.5.

Aug. 9, 2018—Canadian Office Action—CA 2,792,558.

May 20, 2019—European Summons to Oral Proceedings—12189192.3.

* cited by examiner

FIG. 3B

| | Item 1 | Item 2 | Item 3 | ... | Item n |
|---|---|---|---|---|---|
| Item 1 | X | 1.4 | 0.5 | ⋮ | 1.1 |
| Item 2 | 1.5 | X | 4.2 | ⋮ | 1.5 |
| Item 3 | 0.7 | 3.9 | X | ⋮ | 0.6 |
| ⟶ | ... | ... | ... | | ... |
| Item n | 1 | 1.8 | 0.7 | ⋮ | X |

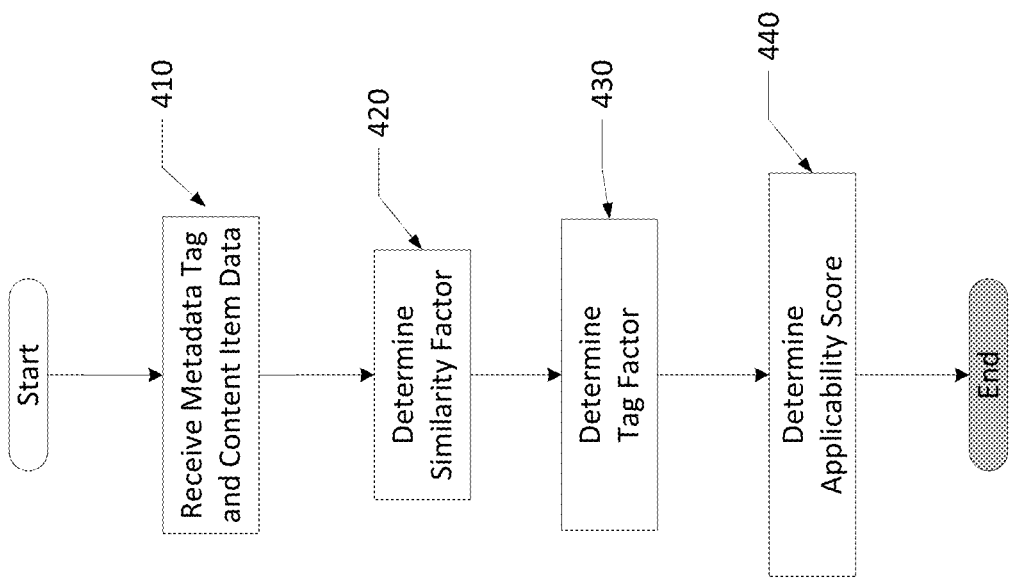

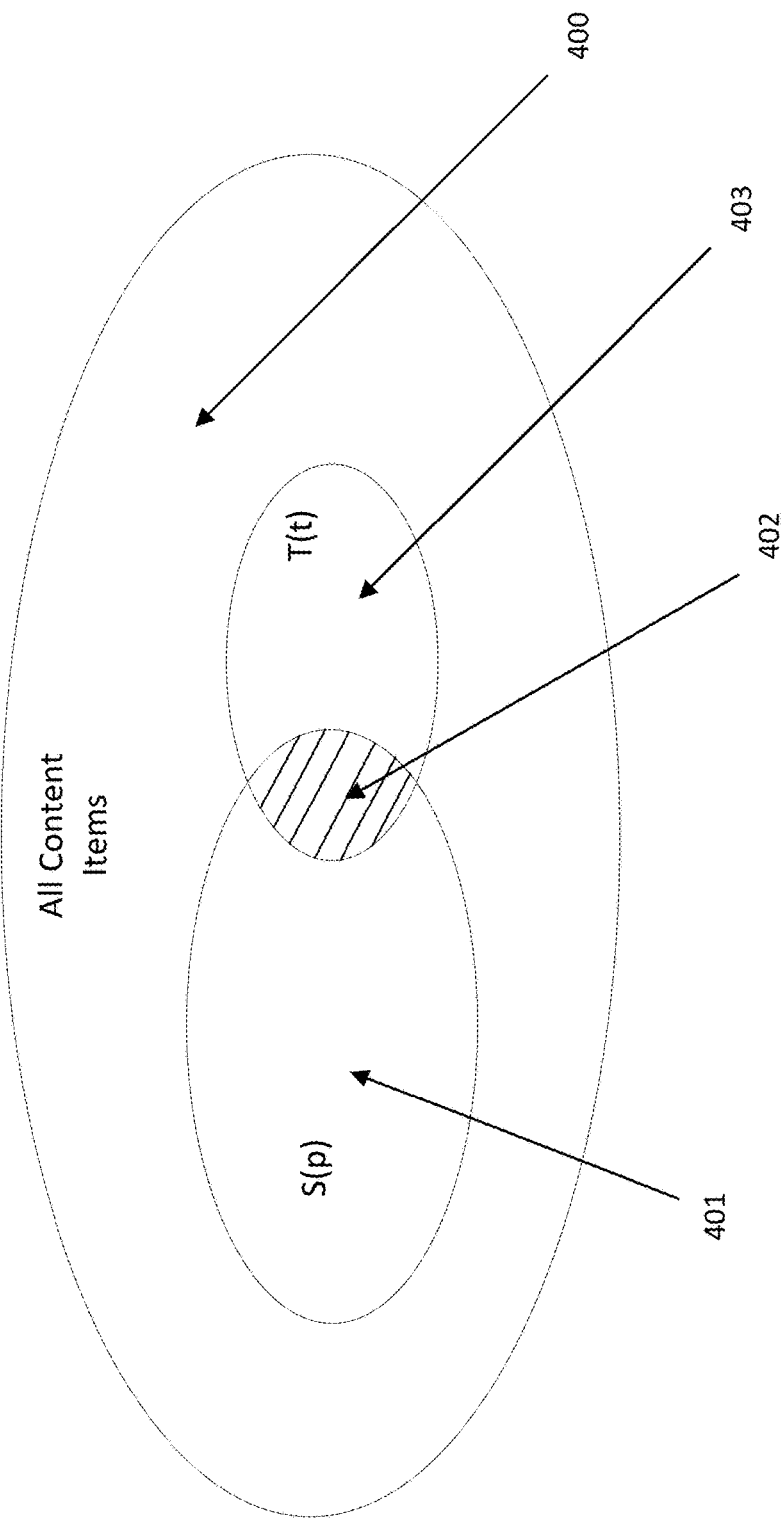

CONTENT RECOMMENDATION SYSTEM WITH WEIGHTED METADATA ANNOTATIONS

RELATED APPLICATION

This application is a continuation of and claims the benefit of priority from U.S. patent application Ser. No. 15/357,722 filed Nov. 21, 2016. The content of the aforementioned application is hereby incorporated by reference in its entirety.

BACKGROUND

Current methods of predicting user entertainment and/or content favorites can be complicated, time-consuming and generate inaccurate results. Given the increasing volume and availability of programming content, it has become remarkably difficult to efficiently process and identify meaningful content for a consumer. The flexibility offered by content recommendation and classification systems can be beneficial, as such, there remains an ever-present need for improved and simplified ways of processing and identifying content similarities to alleviate processing burdens and maximize computing resources for content recommendation systems.

SUMMARY

The following summary is for illustrative purposes only, and is not intended to limit or constrain the detailed description. The following summary merely presents various described aspects in a simplified form as a prelude to the more detailed description provided below.

Features herein relate to an improved content recommendation processing computer and methods, which may be used as a stand-alone recommendation system or comprise a portion of a content recommendation system. According to one aspect of the disclosure herein, an improved content recommendation processing computer and/or system may be used to generate metadata for one or more content items made available to users of a content service. The content recommendation processing computer may automatically annotate content items with a plurality of metadata fields and corresponding tags (e.g., metadata tag values) describing the content items. Additionally or alternatively, the content recommendation processing computer may determine and/or apply an applicability score to a tag in a metadata field of a content item to indicate a level/degree of similarity between the content item and a plurality of programs that have been assigned the same metadata tag. According to another aspect of the disclosure herein, the content recommendation processing computer may utilize determined metadata annotations to calibrate and/or to confirm the accuracy of existing metadata for a plurality of content items, and further may utilize applicability scores to recommend content to users.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIG. 3B shows an exemplary diagram of a similarity matrix according to one or more illustrative aspects of the disclosure.

FIG. 4A shows an exemplary flowchart of a process for applying metadata to content according to one or more illustrative aspects of the disclosure.

FIG. 4B shows an exemplary diagram associated with a process for applying metadata to content according to one or more illustrative aspects of the disclosure.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
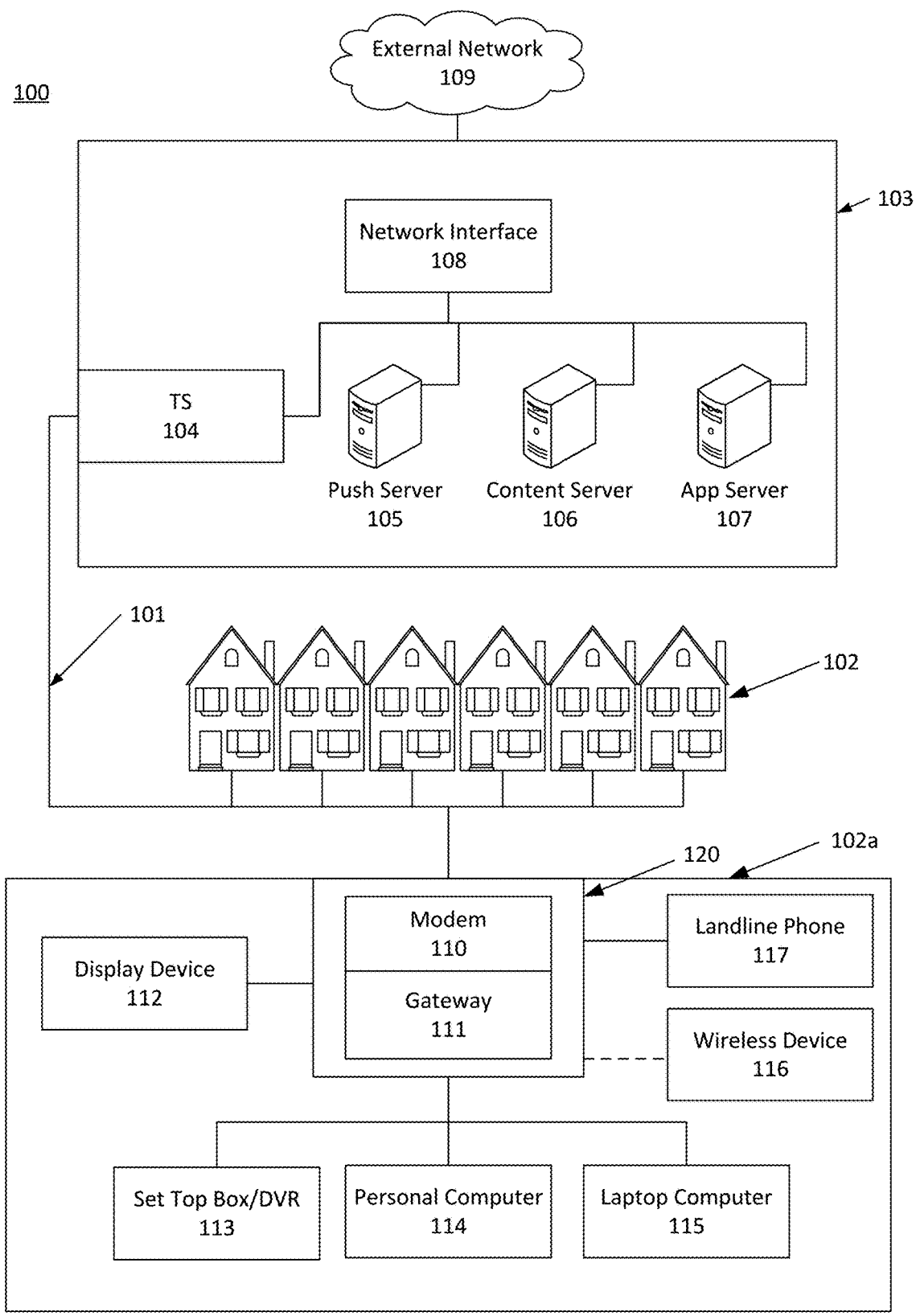
FIG. 1 shows an example communication network on which various features described herein may be used.

FIG. 1 shows an example communication network 100 on which many of the various features described herein may be implemented. The communication network 100 may be any type of information distribution network, such as satellite, telephone, cellular, wireless, etc. One example may be an optical fiber network, a coaxial cable network, or a hybrid fiber/coax distribution network. Such communication networks 100 use a series of interconnected communication links 101 (e.g., coaxial cables, optical fibers, wireless, etc.) to connect the various premises 102 (e.g., businesses, homes, consumer dwellings, etc.) to a local office or headend 103. The local office 103 may transmit downstream information signals onto the communication links 101, and each of the various premises 102 may have a receiver used to receive and process those signals.

There may be one communication link originating from the local office 103, and it may be split a number of times to distribute the signal to the various premises 102 in the vicinity (which may be many miles) of the local office 103. The communication links 101 may include components not illustrated, such as splitters, filters, amplifiers, etc. to help convey the signal clearly, but in general each split introduces a bit of signal degradation. Portions of the communication links 101 may also be implemented with fiber-optic cable, while other portions may be implemented with coaxial cable, other lines, or wireless communication paths.

The local office 103 may include an interface 104, such as a termination system (TS) interface 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These external networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of computing devices 105-107, such as servers, that may be configured to perform various functions. For example, the local office 103 may include a push notification computing device 105. The push notification device 105 may generate push notifications to deliver data and/or commands to the various premises 102 in the network (or more specifically, to the devices in the various premises 102 that are configured to detect such notifications). The local office 103 may also include a content server computing device 106. The content device 106 may be one or more computing devices that are configured to provide content to users at their premises. This content may be, for example, video on demand movies, television programs, songs, text listings, etc. The content server computing device 106 may include software to validate user identities and entitlements, to locate and retrieve requested content, to encrypt the content, and to initiate delivery (e.g., streaming) of the content to the requesting user(s) and/or device(s). Indeed, any of the hardware elements described herein may be implemented as software running on a computing device.

The local office 103 may also include one or more application server computing devices 107. The application server 107 may be a computing device configured to offer any desired service, and may run various languages and operating systems (e.g., servlets and JSP pages running on Tomcat/MySQL, OSX, BSD, Ubuntu, Red Hat, HTML5, JavaScript, AJAX and COMET). For example, an application server may be responsible for collecting television program listings information and generating a data download for electronic program guide listings. The application server 107 may be responsible for monitoring user viewing habits and collecting that information for use in selecting advertisements. The application server may also be responsible for formatting and inserting advertisements in a video stream being transmitted to the various premises 102. Although shown separately, one of ordinary skill in the art will appreciate that the push notification device 105, content server computing device 106, and the application server 107 may be combined. Further, here the push notification device 105, the content server computing device 106, and the application server 107 are shown generally, and it will be understood that they may each contain memory storing computer executable instructions to cause a processor to perform steps described herein and/or memory for storing data.

The example premise 102a, such as a home, may include an interface 120. The interface 120 may include any communication circuitry needed to allow a device to communicate on one or more communication links 101 with other devices in the network. For example, the interface 120 may include the modem 110, which may include transmitters and receivers used to communicate on the communication links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway interface device 111 may be a set-top box (STB), digital video recorder (DVR), computer server, or any other desired computing device. The gateway interface device 111 may also include (not shown) local network interfaces to provide communication signals to requesting entities/devices in the premises 102a, such as the display devices 112 (e.g., televisions), STB and/or DVR 113, the personal computers 114, the laptop computers 115, the wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), the landline phones 117 (e.g. Voice over Internet Protocol—VoIP phones), the tablet computing devices 118, the mobile phones 119, and any other desired devices. Examples of the local network interfaces include Multimedia over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
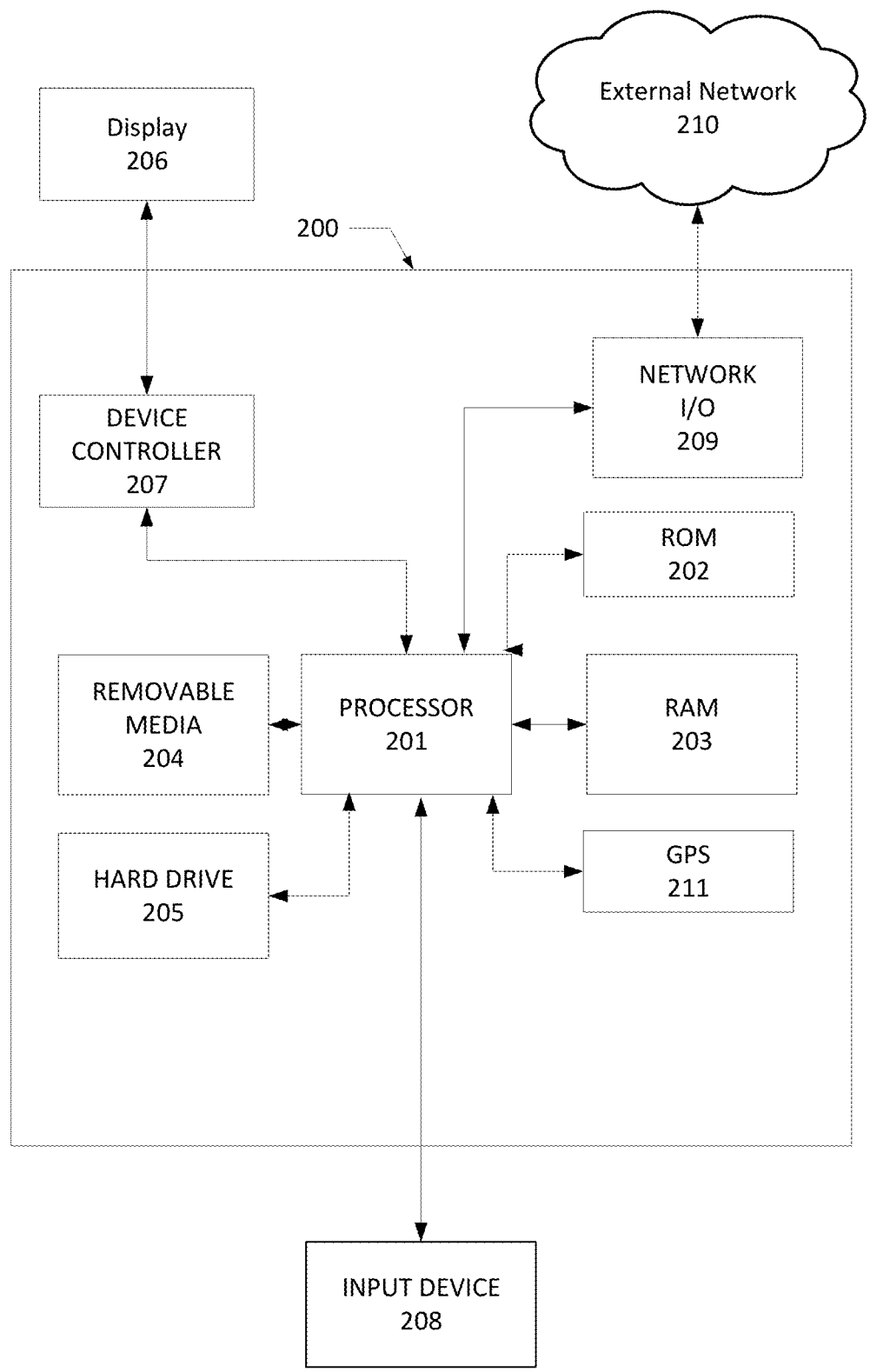
FIG. 2 shows an example computing device that can be used to implement any of the methods, servers, entities, and computing devices described herein.

FIG. 2 shows general hardware elements that may be used to implement any of the various computing devices discussed herein. The computing device 200 may include one or more processors 201, which may execute instructions to perform any of the features described herein. The instructions may be stored in any type of computer-readable medium or memory, to configure the operation of the processor 201. For example, instructions may be stored in a read-only memory (ROM) 202, the random access memory (RAM) 203, the removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may also include a security processor (not shown), which may execute instructions of a one or more computer programs to monitor the processes executing on the processor 201 and any process that requests access to any hardware and/or software components of the computing device 200 (e.g., ROM 202, RAM 203, the removable media 204, the hard drive 205, the device controller 207, a network circuit 209, the GPS 211, etc.). The computing device 200 may include one or more output devices, such as the display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as the network circuit 209 (e.g., a network card) to communicate with an external network 210. The network circuit 209 may be a wired interface, wireless interface, or a combination of the two. In some embodiments, the network circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOC SIS network), or any other desired network. Additionally, the device may include a location-detecting device, such as a global positioning system (GPS) microprocessor 211, which may be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as shown in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The various computing devices, servers and hardware described herein may be implemented using software running on another computing device.

There are numerous ways in which a content recommendations system may recommend content to a user. In some instances, a recommendation system may generate/determine and store metadata for content items, and may recommend a content item to a user based on the stored metadata. In other instances, a recommendation system may recommend content based on analyzing which users have consumed content items, and analyzing the particular content items that have been consumed. For example, a content recommendation system may determine user-based content recommendation by matching a first user to one or more other users based on determining whether content consumed by the first user matches content items consumed by one or more other users. The recommendation system may determine whether content items consumed by the first user matches content items consumed by one or more other users by analyzing stored metadata information for the respective content items. If a match is found, the content recommendation system may recommend, to a first user, content consumed by and/or recommended to the matching user.

As another example, the content recommendation system may determine item-based content recommendations by matching a particular content item to one or more other content items and comparing users that have consumed a particular content item to other users that have consumed one or more other content items. In this example, the recommendation system may be configured to determine a similarity between two content items. The similarity of a first content item (p) to a second content item (q) (denoted as sim(p, q)) may indicate how much more than randomly expected a user will like the first content item, given that the user liked the second content item. This similarity determination may be expressed as the ratio of the number of users that like a first item and a second item to the expected number of users that like the first item and the second item. Accordingly, a similarity determination much greater than 1 may indicate that two content items are very similar, while a similarity determination less than 1 may indicate the two content items are dissimilar. As will be discussed in more detail below, the content recommendation processing system may determine a similarity between two content items in a variety of other manners, such as by comparing metadata, analyzing visual/textual information of the content items, and the like.

For example, the similarity value between a first content item (p) and a second content item (q) may be expressed as:

$$\text{ratio}(p,q) = P(q|p)/P(q)$$

where:
"P(q|p)" comprises the probability that a user will consume content item (q) given that the user has previously consumed content item (p); and where:
"P(q)" comprises the probability that a user has consumed content item (q).

In some instances, the content recommendation processing system may determine P(q p) by determining a fraction/proportion of the total number of users (e.g., the plurality of users that subscribe to and/or are members of the content service) that have consumed content item (p) and content item (q). In this example, the content recommendation processing system may determine P(q) by determining the fraction/proportion of the total number of users that have consumed content item (q). Accordingly, a similarity (e.g., similarity value) between the first content item and the second content item may be determined based on the ratio of the fraction of total users that have consumed the first and second content items to the fraction of users that have consumed the second content item. Given that a similarity value indicating the similarity between two content items may be expressed as a ratio, the magnitude of the similarity value may indicate the level of similarity or dissimilarity between the content items, and thus a determined similarity value may vary between a wide range of values. However, in some instances, a system administrator may prefer that determined similarity values fall within a predetermined scale of values, such as between 0 and 1. Accordingly, in some embodiments, the content recommendation processing system may be configured to adjust and/or normalize determined similarity values.

As described above, to determine which content to recommend to a particular user, content recommendations systems may analyze the metadata of a content item to determine and compare the content item to other content items. Additionally or alternatively, a content service may provide metadata for content to users such that the user may distinguish between the various content items made available for consumption. Typically, analyzing the subject matter and characteristics of content may require a human viewer to consume the content and manually assign labels (e.g., metadata) describing the content. For example, a human editor may watch a movie, and may assign the movie a metadata field (e.g., genre, actor, theme, keyword, etc.). If the editor assigns the movie a genre metadata field, the editor may also assign one or more corresponding metadata tag values (e.g., horror, romance, comedy, etc.) to the genre metadata field describing various genre attributes that apply to and/or characterize the subject matter of the movie.

The entire set of metadata fields and corresponding metadata tag values used to characterize content may be very large, and as such, the manual assignment of metadata to content may be very tedious, incomplete, and subjective. Furthermore, the use of human editors to assign metadata to content may be error-prone, largely because manually assigning metadata to content can be a binary endeavor. Either the content item comprises a certain characteristic and is assigned the metadata, or the content item does not comprise the characteristic and the metadata is not assigned by the editor. However, real-world descriptions and characterizations of content may be more nuanced than the binary determination described above, and more importantly, each tag value applied to a metadata field may not equally characterize or represent the subject matter of the content item.

For example, the genre metadata field for a movie may be assigned a romance tag and a comedy tag to describe the genre and subject matter of the movie. However, simply labeling the movie as a romance movie and labeling the movie as a comedy movie fails to indicate to what extent the movie embodies the characteristics of and/or is similar to other comedy and romance movies, respectively. For example, the entire plot of the movie may focus on a love story between characters, and the movie may include brief moments of levity intermingled within the storyline for the movie. Such a movie may be more similar to a prototypical romance movie than a comedy movie. By contrast, if the entire plot of the movie focused on the crazy antics of a group of friends during a bachelor party where the groom briefly rekindles a relationship with a past girlfriend, such a movie may be more similar to a prototypical comedy movie than a romance movie. Accordingly, assigning a weighting or score to the various values/tags of a metadata field for a content item may provide the user with additional information to proportionately assess the subject matter of the content item. As will be explained in more detail below, in some aspects of the present disclosure, the content recommendation processing system may be configured to generate an applicability score that is appropriate when annotating a metadata field (e.g., genre) of a content item with a particular metadata tag value (e.g., horror).

The applicability score determined for a particular metadata tag value and content item indicates a level or degree of similarity between the content item and a plurality of programs that have also been associated and/or annotated with the particular metadata tag value. For example, when determining whether to annotate the genre metadata field of a particular movie with a horror metadata tag, an applicability score determined for the horror metadata tag and the movie indicates a level of similarity between the particular movie and other movies that have been annotated with a horror metadata tag. Accordingly, the applicability score may represent a degree of suitability for annotating a content item with a particular metadata tag value.

As discussed above, each content item made available to users by a content service may be initially associated with a limited amount of metadata, such as the metadata fields and corresponding tags that were manually applied to the content item by a system administrator. However, given the large number of metadata fields and corresponding tags available to characterize the subject matter of content, a variety of these metadata fields and corresponding tags may not be assigned to each content item available for consumption by users. For example, the content service may use 391 different metadata tag values (e.g., horror, comedy, fantasy, etc.) to characterize the genre of a movie. However, as discussed above, an editor may only apply/assign a subset of those available metadata tag values to a genre metadata field of each movie made available to users. As described herein, in some aspects of the present disclosure, a content recommendation processing system may be configured to generate and assign metadata (e.g., metadata fields and corresponding tags) to content items based on determined applicability scores. As will be explained in more detail below, the content recommendation processing system may utilize existing metadata fields and corresponding tag values for a first set of content items to generate and assign metadata for another set of content items.

In some aspects of the present disclosure, the content recommendation processing system may be configured to calibrate and/or quality check an existing metadata tag value for a content item in view of an applicability score determined for the metadata tag and content item. As noted above, the applicability score for a particular metadata tag value and content item may indicate the degree of similarity between the content item and other content items that have also been annotated with the particular metadata tag. Thus, the appropriateness of an existing metadata tag value assigned to a content item may be assessed based on the applicability score determined for the existing metadata tag value. In particular, the content recommendation processing system may determine whether to remove or maintain the existing metadata tag value for the content item by comparing the determined applicability score to a threshold value (e.g., threshold applicability score).

In other aspects of the present disclosure, the content recommendation processing system may utilize the applicability score for a particular metadata tag value and content item when determining whether to apply and/or annotate a metadata field of the content item with the particular metadata tag. As noted above, an applicability score may indicate how applicable or suitable it would be to annotate a content item with a particular metadata tag value. The content recommendation processing system may determine whether to apply or annotate a metadata tag value to the content item by comparing the applicability score determined for a metadata tag value and content item to a threshold value. For example, when determining whether to assign a horror metadata tag value to the genre metadata field of a movie, the content recommendation processing system may compare the applicability score for the horror metadata tag value and movie to a threshold applicability score. Various threshold values may be utilized by the content recommendation processing system when assessing the applicability/suitability of a metadata tag annotation.

As will be explained in more detail below, the content recommendation processing system may use applicability scores to determine whether to apply available metadata tag values to content items that have not been annotated with certain metadata tag values or any metadata tag values, such as newly-released movies and/or classic movies that are being added to a content server for the first time by the content service. Assessing metadata fields for content items based on determined applicability scores may allow the content recommendation processing system to more efficiently process and identify meaningful content for a user and to generate/improve metadata for content items such that the user is provided with more precise content recommendations and programming information for content items, while also reducing the amount of computing resources required by the content recommendation processing computer to classify/annotate a large volume of content items. In some aspects of the present disclosure, applicability scores may be used to affect which content items are recommended to a user, and/or may affect the presentation of content items and/or programming information to a user on a content service application or user interface (e.g., an electronic program guide).

Figure 3A:
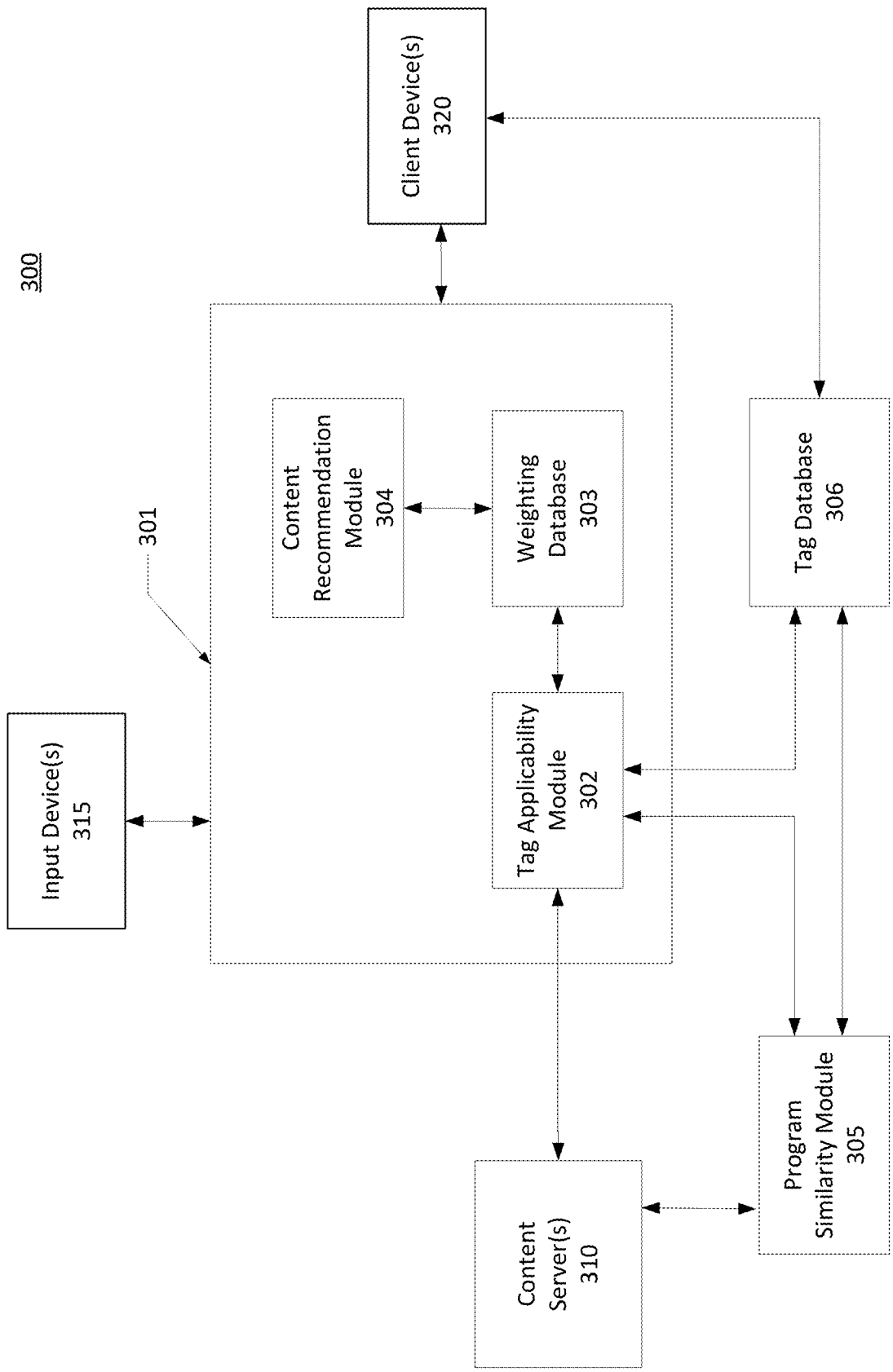
FIG. 3A shows an exemplary system for assigning metadata and corresponding applicability scores for a content recommendation processing system according to one or more illustrative aspects of the disclosure.

FIG. 3A shows an exemplary system for generating metadata tag values and corresponding applicability scores for a content recommendation processing system. The system 300 includes a content recommendation processing computer 301, a tag applicability module 302, a weighting database 303, a content recommendation module 304, a program similarity module 305, a tag database 306, one or more content servers 310, an input device 315, and one or more client devices 320. One or more portions of system 300 may reside in one or more computing devices residing in various locations. The one or more computing devices comprising the content recommendation processing system may be implemented as a computing device using the structure shown in FIG. 2, and may be configured to respond to user requests for content, such as streaming video or audio. For example, the content recommendation processing computer 301 may be configured to receive user requests for content and/or user feedback from the input device 315 and/or the client device 320. The input device 315 may comprise a remote control, keyboard, mouse, touch screen, microphone, and/or other suitable means for receiving user input. In some aspects of the present disclosure, the input device 315 may incorporate aspects and/or features of input device 208 described above.

As shown in FIG. 3A, in the content recommendation processing computer 301 may be operatively connected to and/or in communication with the tag database 306, which stores a plurality of metadata tag values that may be assigned to one or more metadata fields of a content item. In some aspects of the present disclosure, a content item may comprise a plurality of metadata fields and metadata tag values used to describe characteristics of the content item. As noted above, metadata tag values may be used to describe a particular characteristic of a content item and/or a portion of a content item. Each metadata tag value may be associated with and/or assigned to a particular metadata field. Examples of metadata fields and corresponding metadata tag values for video content may include genre (e.g., animated, family entertainment, children entertainment, fantasy, horror, action, fantasy, comedy, adventure, documentary, drama, romance, adaption, foreign, science fiction, paranormal, etc.); theme (e.g., imaginary kingdom, daring rescues, evil aliens, save the world, space travel, fantasy lands, heroic mission, curses and spells, fall in love, save the day, chasing a dream, state affairs, class differences, etc.); tone (e.g., fanciful, creepy, deadly, gruesome, humorous, rousing, stylized, witty, quirky, satirical, deadpan, clever, sarcastic, etc.); keyword (e.g., friendship, pop-culture, hero, partner, fantasy-world, danger, UFO, alien, disaster, chaos, etc.). Various other metadata fields and associated metadata tag values may be stored within the tag database 306 and utilized by the content recommendation processing system without departing from the scope of the present disclosure. In some embodiments, metadata fields and metadata tag values may also be used to describe other types of content, such as audio content and the like.

In some aspects of the present disclosure, the tag database may be populated with metadata fields and metadata tag values used to describe/characterize content stored in the content server 310. The fields and tag values may be imported from another computing device or may include the various fields and tag values that have been used by the content service over time to describe content made available to users. In some embodiments, a user may populate the tag database with additional metadata tag values. The client device 320 may be configured to execute a content service application or other suitable interface (e.g., an electronic program guide) such that a user may browse and select content items for consumption. In some embodiments client device 320 may incorporate one or more aspects and/or features of the computing device 200 described above in reference to FIG. 2. The client device 320 may be further configured to receive user input data indicating characteristics of a content item that may be used to generate and/or assign a metadata tag value to a content item. The client device may be configured to generate a metadata tag value utilizing one or more characteristics of a content item and/or a portion of a content item provided by the user, and the client device may be further configured to transmit the generated metadata tag value to tag database 306. Accordingly, a portion of the metadata tag values stored in tag database 306 may comprise metadata tag values created by system administrators, while other metadata tag values in tag database 306 may comprise metadata tag values created by users.

The content server 310 may comprise one or more computing devices configured to provide content items to users at their premises (e.g., at the client device 320). As discussed above, content items may be, for example, video on demand movies, television programs, songs, text listings, etc. In some embodiments, the client device 320 may incorporate one or more features and/or aspects of the content server 106 described above with respect to FIG. 1. Although not shown in FIG. 3A, the client device 320 may be operatively connected to the content server 310, and may further be configured to request and/or receive content items stored at the content server 310. Content consumption histories and viewing habits for a plurality of users of the content service may be stored at the content server 310, and/or another suitable computing device operatively connected to the content server 310. As users consume and/or reserve content items for consumption, the content server 310 and/or other suitable computing device may monitor and store each user's viewing and consumption habits. In some embodiments, the consumption history data for a user may comprise video-on-demand (VOD) viewing habits (e.g., where a user may actively decide which content items to consume), linear content viewing habits (e.g., where a user is watching content items broadcast by a television network), and/or a combination of both.

In some aspects of the present disclosure, a portion of the content items stored at the content server 310 may comprise existing metadata tag information describing different characteristics of each content item. For example, in some instances, a content service may utilize system administrators and/or other editors to review and annotate a portion of the content items that are stored in the content server 310. Over time, metadata information may be assigned to a plurality of content items stored at the content server 310. However, as discussed above, the process of manually reviewing and annotating a large repository of content items in view of a large set of available metadata tag values may be arduous, time consuming, and incomplete. Additionally, the manual assignment of metadata tag values may typically prioritize those content items that are most popular and/or that have been consumed by a large number of users. Furthermore, it may be largely unreasonable and/or inefficient to expect editors to watch millions of content items in order to homogenously (and accurately) assign metadata tag values to one or more metadata fields/attributes for each content item, and in particular, assigning metadata tag values to sparsely-consumed content items.

The program similarity module 305 may be used to alleviate the burden of manually creating metadata tag values for content items stored in a content server, and may comprise one or more computing devices configured to generate and/or store a usage-based similarity matrix between content items (e.g., content items stored at the content server 310). As discussed above, a computing device (e.g., a collaborative filtering recommendation computer) may determine a value (e.g., sim(p, q)) indicating a similarity between a first content item (p) and a second content item (q). In some instances, the program similarity module 305 may be configured to determine a similarity value between two content items. Additionally or alternatively, the program similarity module 305 may be configured to retrieve from a computing device the similarity value between two content items. In some instances, the similarity value between a first content item and a second content item may be expressed as the ratio of a number of users that like the first item and the second item to the expected number of users that like the first item and the second item.

In other instances, the similarity value between a first content item and a second content item may be expressed as the ratio of the fraction of total users that have consumed the first and second content items to the fraction of total users that have consumed the second content item. The program similarity module 305 or another suitable computing device, may be configured to retrieve and process the content consumption history for a plurality of users to determine the similarity value between content items. The program similarity module 305 may be configured to transmit similarity data to another computing device upon request. For example, the program similarity module 305 may be configured to determine the respective similarity values between a first content item and a plurality of other content items (e.g., content items stored in the content server 310), and transmit similarity data indicating the determined similarity values to another computing device. In some embodiments, the content recommendation processing computer 301 may be configured to generate and/or store a usage-based similarity matrix between content items, as described above.

FIG. 3B shows an example usage-based similarity matrix that may be generated by the program similarity module 305 for a number of content items ("n") stored in the content server 310. As shown in FIG. 3B, each column and each row in the matrix may represent a content item stored in the content server, such that the matrix includes "n" columns and "n" rows. Each entry in the matrix may indicate a similarity value between two content items. The program similarity module 305 may determine a similarity between a first content item and each remaining content item in the content server. For example, as shown in FIG. 3B, the program similarity module 305 may determine a similarity value between item 1 and item 2 (i.e., 1.5), between item 1 and item 3 (i.e., 0.7), and so forth until a similarity value has been determined between item 1 and the $n^{th}$ content item. The program similarity module 305 may continue to populate the matrix by determining similarity values for each potential pairing of content items. As shown in FIG. 3B, the program similarity module 305 may not determine a similarity value between the same content item (i.e., sim(item 1, item 1)). Accordingly, the program similarity module 305 may determine a similarity between any two content items using the similarity matrix. Given that user content preferences and the number of content items stored on the content server 310 may vary, program similarity module 305 may be configured to dynamically and/or periodically update the information stored in the similarity matrix.

The usage-based similarity data generated by and/or stored at the program similarity module 305 indicates a similarity between content items, and as will be explained in more detail below with respect to FIGS. 4A-B, the program similarity module 305 may determine similarities in metadata tag values between content items. In some embodiments, the tag applicability module 302 may request from program similarity module 305 the similarity values for a pair of content items. Any number of methods may be utilized by the program similarity module 305 and/or the content recommendation processing system 300 to determine a level of similarity (e.g., similarity values) between content items without departing from the scope of the present disclosure. The program similarity module 305 may generate the similarity matrix based on the obtained data indicating a level of similarity between content items.

The tag applicability module 302 may be configured to generate an applicability score for a metadata tag value that has been and/or can be assigned to a content item. As shown in FIG. 3A, the tag applicability module 302 may be in communication with the program similarity module 305, the tag database 306, and the content server 310. In some aspects of the present disclosure, for any given content item (P) stored in the content server 310 and metadata tag value (T) stored at the tag database 306, the tag applicability module 302 may utilize similarity data stored at program similarity module 305 to generate an applicability score indicating the suitability of assigning "t" to a metadata field of P. In some embodiments, the tag applicability module 302 may be configured to generate applicability scores within a predetermined threshold scale of values. For example, the tag applicability module 302 may generate applicability scores between 0 and 1 for a metadata tag value. As another example, the tag applicability module 302 may generate applicability scores between 0 and 100. Various threshold applicability score scales may be utilized by the tag applicability module 302 without departing from the scope of the present disclosure.

FIG. 4A shows an example method for determining an applicability score for a metadata tag value and content item according to one or more aspects described herein. The steps shown in FIG. 4A may be performed by a content recommendation processing system, for example, by content recommendation processing system 300 described above with respect to FIG. 3A, and/or by one or more computing devices at the local office 103, such as content server 106. The steps may also be implemented by a distributed computing system, having devices at various locations. One or more computing devices may be implemented as a computing device using the structure shown in FIG. 2, and may be configured to respond to user requests for content, such as streaming video or audio. In some aspects of the present disclosure the content recommendation processing system may be operatively connected to and/or integrated within a content recommendation system. In such aspects of the present disclosure, the content recommendation processing system may provide video on demand services, and may deliver streaming media, such as sport exhibitions, movies, television shows, radio programs and Internet videos and/or audio, to a user's consumption or access device (e.g., the display device 112, the gateway interface device 111, the personal computer 114, the wireless device 116, etc.), or any other desired computing device. For brevity, the following description will generally assume that the steps shown in FIG. 4A are performed by content recommendation processing computer 301.

In step 410, the content recommendation processing computer 301, may receive information identifying a metadata tag value (t) and a content item (p) for which the metadata tag may be applied. For example, the metadata tag value may be a horror metadata tag that has been and/or can be applied to a movie. As will be described in more detail below, the content recommendation processing computer 301 may determine an applicability score indicating a level of suitability for assigning/annotating the content item with the metadata tag value. A computing device, (e.g., the content server 310, the application server 107, etc.) may push an identifier for a content item to the content recommendation processing computer 301. Another computing device, (e.g., tag database 306) may push an identifier for a metadata tag value to the content recommendation processing computer 301. Alternatively, the content recommendation processing computer 301 may receive an identifier for a metadata tag value and/or a content item from a computing device in response to a request. For example, a user or system administrator may request the content recommendation processing computer to determine an applicability score for a particular metadata tag and content item by entering a command via an input device.

To better understand the relationship between the applicability score for a metadata tag value (t) and a content item (p), two key elements are involved. The first element, a similarity factor (denoted as "simf(p,t)"), represents the proportion of the similarity between other content items that are similar to "p" and that have also been annotated with T.

The content recommendation processing computer 301 may be configured to determine a set of content items that are similar to "p" (denoted as "S(p)") based on similarity data for "p," such as similarity data stored in a similarity matrix. Referring to the example FIG. 4B, the content recommendation processing computer 301 may receive an identifier for the movie Shrek and an action metadata tag value, as discussed in step 410. As shown in FIG. 4B, area 400 depicts the set of all content items that may be available for consumptions to users of a content service, such as all of the content items stored at the content server 310. As depicted by the area 401 in FIG. 4B, S(p) represents the set of all content items that are similar to Shrek (i.e., content item "p").

The content recommendation processing computer 301 may determine whether a content item is similar to the movie Shrek by comparing a similarity value between Shrek and the content item (i.e., "sim(Shrek, x)") to a predetermined threshold value. For example, the content recommendation processing computer 301 may query a computing device (e.g., program similarity module 305) to receive a similarity value between Shrek and a content item ("x"). The content recommendation processing computer 301 may determine a threshold similarity value for comparing the similarity of content items. In some instances, the threshold similarity value may be provided by a system administrator and/or another computing device. The content recommendation processing computer 301 may determine that the content item is similar to Shrek if the similarity value between Shrek and the content item (i.e., "sim(Shrek, x)") satisfies the predetermined threshold value.

As depicted by area 403 in FIG. 4B, T(t) represents the set of all content items that have been annotated with the action metadata tag value "t." The content recommendation processing computer 301 may be configured to determine a set of content items that have been annotated with the action metadata tag value "t" (i.e., "T(t)"). For example, the content recommendation processing computer 301 may utilize an identifier for the action metadata tag value "t" to query a computing device (e.g., server 310) to receive data indicating one or more other content items that have been annotated with and/or includes the action metadata tag value "t."

As noted above, the similarity factor (denoted as "simf (p,t)"), indicates the proportion of the total level of similarity (as represented by a sum of similarity values) between content having a threshold similarity to "p" that have been annotated with "t." Referring to the example FIG. 4B, the hashed area 402 comprises the subset of programs that are similar to the movie Shrek, which have also been annotated with the action metadata tag. The hashed area 402 similarly comprises the subset of programs that have been annotated with the action metadata tag value that are similar to the movie Shrek. In this example, the "similarity factor" for Shrek and the action metadata tag value comprises the ratio of the sum of similarity values between Shrek and content items within the area 402 to the sum of similarity values between Shrek and content items within the areas 401 and 402.

In step 420, the content recommendation processing computer 301, may determine a similarity factor for the metadata tag value and content item determined at step 410. In some embodiments, the similarity factor for a content item "p" and a metadata tag value "t" is determined using Equation (1):

$$simf(p,t) = tagged/total \qquad (1)$$

where:
the denominator of Equation (1) comprises a "total" parameter that is determined using Equation (2):

$$(2) \quad \text{total} = \sum_{q \in S(p)} \text{similarity}(p, q)$$

where:
similarity(p,q) comprises a similarity value indicating a level of similarity between the content item "p" and another content item ("q").

The "total parameter" in Equation (1) indicates the sum of similarity values between "p" and each content item ("q") in the set of other content items that are similar to "p." Referring to the example in FIG. 4B, the total parameter would represent the sum of similarity values between the movie Shrek and each content item in the set of content items determined to be similar to Shrek (i.e., the areas 401 and 402). In some embodiments, the tag applicability module 302 may determine the set of content items that are similar to Shrek by querying the program similarity module 305. As noted above, the program similarity module 305 may retrieve similarity data from a similarity matrix to determine S(p). The program similarity module 305 may be further configured to transmit data indicating S(p) to the tag applicability module 302, as well as corresponding similarity values for each content item in S(p).

The numerator of Equation (1) further comprises a "tagged parameter" that is determined using Equation (3):

$$(3) \quad Q = \{q \mid q \in S(p) \text{ and } q \text{ is tagged with } t\}$$
$$\text{tagged} = \sum_{q \in Q} \text{similarity}(p, q)$$

where "Q" comprises a subset of content items, which includes content items that belong to S(p) and content items that have been annotated with metadata tag value "t."

Referring to the example FIG. 4B, the subset of content items comprising "Q" are represented by the content items located within the hashed area 402. The "tagged parameter" indicates the sum of similarity values between content item "p" and each content item in "Q", i.e., the set content items that are both similar to the movie Shrek and have been annotated with the action metadata tag value. Accordingly, for the example in FIG. 4B, the tagged parameter comprises the sum of similarity values between Shrek and each content item within the hashed area 402. In some embodiments, the tag applicability module 302 may determine the set of content items in the content server 310 that are similar to a particular content item and that have been tagged with a particular metadata tag by querying program similarity module 305.

Referring back to Equation (1), the content recommendation processing computer 301 may be configured to determine the similarity factor for the content item and metadata tag value, such as the content item and metadata tag value identified at step 410 by computing the ratio of the tagged parameter to the total parameter. In the example depicted in FIG. 4B, the similarity factor for Shrek and the action metadata tag value comprises the ratio of the sum of similarity values between Shrek and content items within the area 402 to the sum of similarity values between Shrek and content items within the areas 401 and 402.

The second element in understanding the relationship between the applicability score for a metadata tag value (t) and a content item (p) is a tag factor (denoted as tagf(p,t)). The tag factor represents the proportion of content items that have been annotated with the metadata tag value "t" that are similar to the content item "p." As discussed above, a similarity between two content items may be determined based on the similarity value between the two content items satisfying a predetermined threshold. The content recommendation processing computer 301 may be configured to determine a number of content items that have been annotated with metadata tag value "t" (denoted as "|T(t)|") by query a computing device (e.g., the content server 310) to receive data indicating the number of content items that have been annotated with and/or include the metadata tag value "t." As depicted by area 403 in FIG. 4B, T(t) represents the set of all content items that have been annotated with the action metadata tag value "t." Thus, for this example, content recommendation processing computer 301 may determine |T(t)| by determining the number of content items that have been annotated with the action metadata tag value.

As noted above, the tag factor (denoted as "tagf(p,t)"), indicates a proportion of the content items annotated with "t" that have a threshold similarity "p." Referring to the example FIG. 4B, the hashed area 402 comprises the subset of content items that are similar to the movie Shrek, which have also been annotated with the action metadata tag. The hashed area 402 similarly comprises the subset of content items that have been annotated with the action metadata tag value that are similar to the movie Shrek. In this example, the tag factor for Shrek and the action metadata tag comprises the ratio of the number of content items within the area 402 to the number of content items within the areas 402 and 403.

In step 430, the content recommendation processing computer 301, may determine a tag factor for the metadata tag value and content item determined at step 410. In some embodiments, the "tag factor" is determined using Equation (4):

$$\text{tag}f(p,t) = \text{similars/tag total} \quad (4)$$

where:
the denominator of Equation (4) comprises a "tag total" parameter that is determined using Equation (5):

$$\text{tag total} = |T(t)| \quad (5)$$

where:
|T(t)| comprises the number of content items in T(t), e.g., the number of content items that have been annotated with a particular metadata tag value. In some embodiments, the program similarity module 305 may be further configured to determine the number of content items in the content server 310 that have been annotated with a particular metadata tag value, and may be further configured to transmit to tag applicability module 302 this data. In still other embodiments, the tag applicability module 302 may be configured to query a computing device (e.g., the content server 310) to determine the number of content items that have been annotated with a particular metadata tag. As shown in FIG. 4B, |T(t)| represents the number of content items in the areas 402 and 403, i.e., the number of content items that have been annotated with the action metadata tag value.

The numerator of Equation (4) further comprises a "similars" parameter that is determined using Equation (6):

$$Q = \{q \mid q \in S(p) \text{ and } q \text{ is tagged with } t\} \text{similars} = |Q| \quad (6)$$

Similar to Equation (3), the "Q" in Equation (6) comprises a subset of content items, including content items that belong to S(p) and content items that have been annotated with metadata tag value "t." Referring to the example in FIG. 4B, the subset of content item comprising "Q" is represented by the content items located within the hashed area 402. The "similars" parameter indicates the total number of content items that are both similar to the movie Shrek and have been tagged with the action metadata tag value. Referring back to Equation (4), the content recommendation processing computer 301 may be configured to determine the tag factor for the content item and metadata tag value, such as the content item and metadata tag value identified at step 410 by computing the ratio of the number of content items within the area 402 to the number of content items within the areas 402 and 403.

In step 440, the content recommendation processing computer 301, may determine an applicability score for the metadata tag value and content item determined at step 410. The content recommendation processing computer 301 may be configured to determine an applicability score (denoted as "weight(p,t)") for a metadata tag value and a content item based on the similarity factor, as determined at step 420, and the tag factor as determined at step 430.

In some embodiments, an applicability score is determined using Equation (7):

$$\text{weight}(p,t) = \text{sim}f(p,t) \cdot \text{tag}f(p,t) \tag{7}$$

where the applicability score for a metadata tag and content item pairing (denoted as "weight(p,t)") comprises the product of the similarity factor and tag factor for the metadata tag and content item pairing. In such embodiments, the tag applicability module 302 may be configured to generate the applicability score for a metadata tag value "t" and a content item "p" by utilizing Equations 1-7 described above. The tag applicability module 302 may be configured to store the generated applicability score in the weighting database 303. In some aspects of the present disclosure, the tag applicability module 302 may generate applicability scores for each metadata tag stored in the tag database 306 with respect to one or more content items or group of content items stored in the content server 310. In some aspects of the present disclosure, the weighting database 303 may store applicability scores for every potential metadata tag and content item pairing in view of the plurality of metadata tag values stored in the tag database 306 and the plurality of content items stored in the content server 310.

Referring back to FIG. 3A, the content recommendation module 304 may be configured to generate content recommendations for a user or group of users. In some aspects of the present disclosure, the content recommendation processing computer 301 may receive input from a computing device (e.g., the client device 320) indicating a request for a particular type of content item. For example, a user may utilize an electronic program guide (or other suitable user interface) via the client device 320 to request the display of a listing of content items having a specified metadata field and/or metadata tag value, such as horror movies. In this example, the content recommendation processing computer 301 may query the content recommendation module 304 to generate a plurality of content items corresponding to the user content request. Referring back to the example above, if a user requests a list of recommended horror movies, the content recommendation module 304 may query weighting database to determine one or more content items that have been annotated with a horror metadata tag value and that have a corresponding applicability score that exceeds a predetermined threshold value.

Additionally or alternatively, the content recommendation module 304 may be configured to modify the display of recommended content items and/or programming content that are provided to a user. For example, content recommendation module 304 may sort/rank content items annotated with a horror metadata tag value by ascending order of corresponding applicability scores. As a result, content items having the largest applicability scores for their respective horror metadata tag values, and thus are most similar to the prototypical horror movie, may be presented at the top of a list of preferred content items for the user. By contrast, content items having the lowest applicability scores for their respective horror metadata tag values, and thus are least representative of the prototypical horror movie, may be placed toward the end of such list, or not presented to the user at all. For instance, the content recommendation module 304 may not present to the user any content items annotated with a horror metadata tag value having an applicability score below a predetermined threshold value. In such examples, in response to the content request for horror movies, content recommendation module 304 may return a predetermined number of content items having the highest relative applicability scores associated with their respective horror metadata tag value.

In some aspects of the present disclosure, the content recommendation module 304 may be configured to determine a plurality content items that have similar metadata tag values and applicability scores as a target content item. For example a user at the client device 320 may indicate a viewing preference for a particular content item (e.g., target content item), and may request the content recommendation computer 301 to determine one or more content items that are similar to (or "more like") the target item. In this example, content recommendation module 304 may identify and store in memory (or other suitable storage) each metadata field and corresponding metadata tag values for the target content item. The content recommendation module 304 may query the weighting database 303 to identify a content item annotated with similar metadata tag values and corresponding applicability scores as the target content item. For example, the content recommendation module 304 may query the weighting database 303 to identify a content item having a first metadata tag value that has been assigned an applicability score that is within a threshold value of the applicability score assigned to the same metadata tag value for the target content item.

In other aspects of the present disclosure, content recommendation module 304 may utilize content consumption history and/or user content preferences/rankings of a user to determine recommended content items. The content recommendation module 304 may generate content recommendations based on a consumption history of the user requesting content recommendations, the consumption history of one or more other users or groups of users, and/or other user content consumption preferences. For example, the content recommendation module 304 may be configured to analyze the metadata field and corresponding metadata tag values of a content item (e.g., target content item) that has been consumed (or reserved) by a user more than a threshold number of instances within a predetermined time period (e.g., 1 week, 1 month, etc.). The content recommendation module 304 may be further configured to determine one or more content items annotated with similar metadata tag values and corresponding applicability scores as the target content item. As another example, the content recommendation module 304 may be configured to analyze the metadata field and corresponding metadata tag values of a content item for which the user has indicated a viewing preference. A user may indicate a viewing preference for a content item in various ways without departing from the scope of the present disclosure, such as by providing a high or low ranking to the content item, marking the content item with either a "favorite" or "dislike" indicator, and the like. The content recommendation system 304 may recommend content items to the user that have similar metadata tag values and corresponding applicability scores as the target content item, and may be further configured to deprioritize and/or suppress content recommendations for content items that are associated with content items for which the user has indicated a negative viewing preference, such as content items having low rankings and/or are associated with a dislike indicator.

As discussed above, requiring a system administrator to determine and assess the suitability of annotating a content item with a metadata tag value can be time consuming and error prone. These issues may be compounded when attempting to annotate each metadata field of a content item with a plurality of available metadata tag values, or when determining applicability scores for a large number of content items. For example, a content service provider may desire to add one or more new content items, such as a newly released movie, to a plurality of content items available to users for consumption. Each new content item made available to users may contain a limited amount metadata (if any), or may only contain metadata for a limited set of metadata fields. Accordingly, when adding a new content item to a content server and/or when supplementing/refreshing metadata for content items in the content server, the content provider may require a recommendation system capable of assigning metadata tag values to a plurality of metadata fields of a content item. Additionally or alternatively, the content provider may require the recommendation system to update applicability scores for existing content items based on the new content item and associated metadata.

As discussed above with respect to FIG. 4B, the content recommendation processing system may be configured to generate an applicability score for a metadata tag value and a content item indicating a level/degree of suitability for annotating the content item with the metadata tag value. In additional aspects of the present disclosure, the content recommendation processing system may be configured to assign metadata tag values to a metadata field of a content item based on applicability scores determined for the respective metadata tag values.

Figure 5:
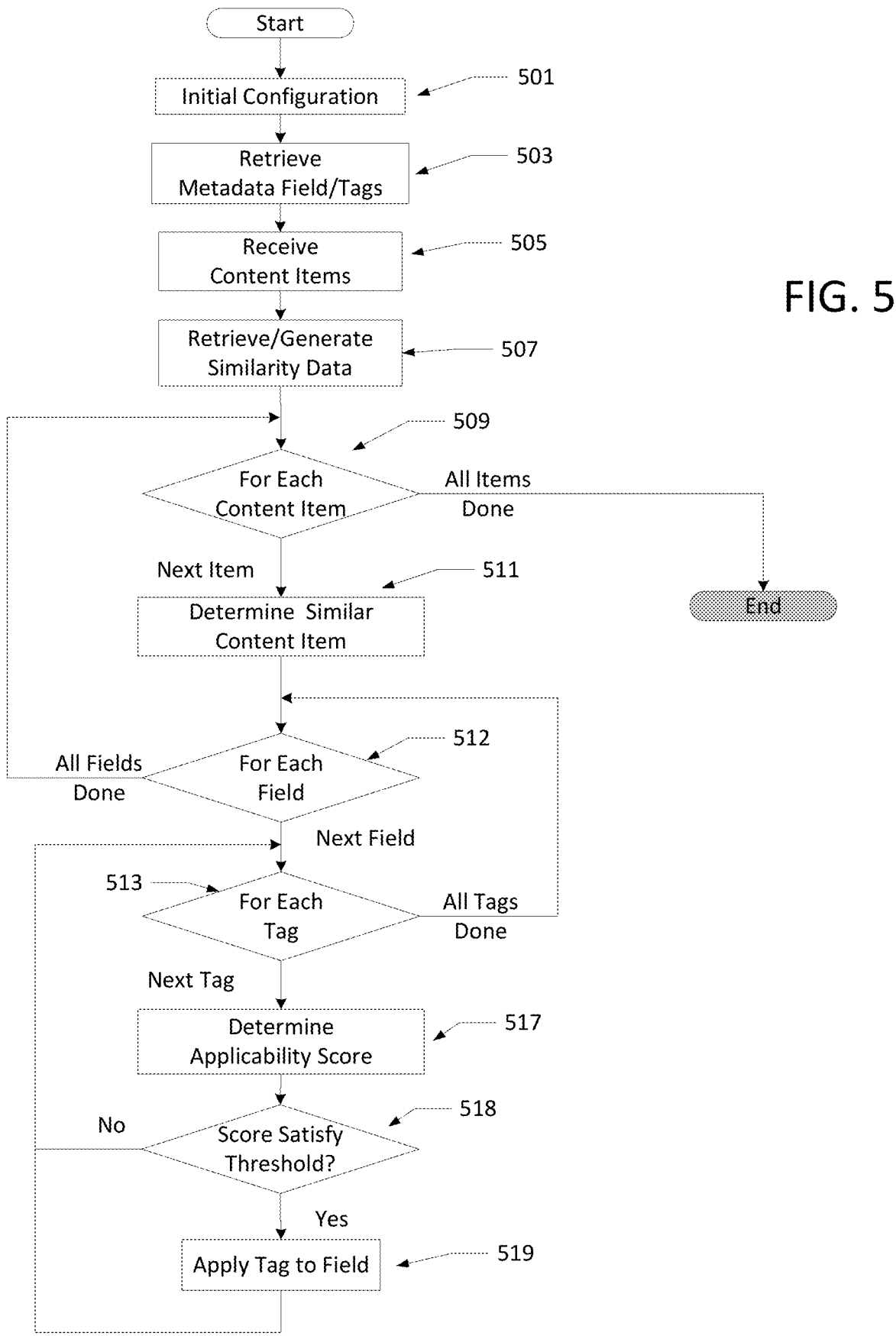
FIG. 5 shows an exemplary flowchart of a process for generating and/or assigning metadata and corresponding applicability scores according to one or more illustrative aspects of the disclosure.

FIG. 5 is an exemplary flowchart of a process for generating and assigning metadata tag values and corresponding applicability scores to content items according to one or more illustrative aspects of the disclosure. The generation of metadata tag values for various metadata files of a content item may be implemented on its own by a content recommendation processing system to add and/or supplement metadata for a plurality of content items. The content recommendation processing system may generate applicability scores for each metadata tag value and content item to determine the suitability of annotating the content item with the metadata tag value. As will be discussed in further detail below, the generated weight scores may be further utilized by the content recommendation system to suggest content to a user, and/or may be combined with other recommendation systems and entertainment program guides.

The steps shown in FIG. 5 may be performed by a content recommendation processing system (e.g., by content recommendation processing system 300 described above with respect to FIG. 3A). For example, the steps may be implemented by the content recommendation processing system computer 301. The steps may also be implemented by a distributed computing system, having devices at various locations. For brevity, the following description will generally assume that the steps shown in FIG. 5 are performed by the content recommendation processing computer 301. In step 501, the content recommendation processing computer 301 may perform various system configuration steps. This configuration process may include registering user consumption or access devices with a content provider. For example, this registration step may include receiving information (e.g., a username, password, device ID, etc.) for setting up a user account with a content provider. When setting up the account, a user may specify content, and/or device preferences that may determine, at least partially, which content items are subsequently provided to the user. Additionally or alternatively, users may have the option to generate and/or modify existing metadata fields and tag information for a plurality of content items. For example, a user may create a new metadata tag value to describe a characteristic of a content item. As another example, the user may choose one or more metadata tag values from a database to associate with (and/or annotate) a particular content. Additionally or alternatively, a user may establish (or indicate) their content preferences by providing rankings for certain content items and/or metadata fields of a content item. For instance, within the genre metadata field of a content item, a user may have the option to provide rankings for a plurality of metadata tag values (e.g., horror, action, adventure, comedy, etc.).

Various metadata tag values (and/or other information) may be included within (and/or annotated to) a metadata field of a content items without departing from the scope of the present disclosure. One or more client or access devices associated with a user may be configured to permit the user to assign rankings to various metadata files and corresponding tag values, as described above. The one or more client or access devices utilized by the user may also be configured to transmit user rankings to a content provider. In some aspects of the present disclosure, the one or more client or access devices associated with the user may also be configured to generate metadata tag values, and annotate a content item with the metadata tag values.

As discussed above a plurality of metadata tag values may be stored in a tag database and used to describe various characteristics of a content item or a portion of a content item. In some aspects of the present disclosure, the metadata tag values stored in the database may comprise tag values created by system administrators to describe various characteristics of the plurality of content items made available to users for consumption. In step 503, the content recommendation processing computer 301 may determine and/or identify one or more available metadata tag values that are associated with available content items, such as content items stored in a content server. In some instances, the content recommendation processing system may identify/process a universe of available metadata tag values that may be used to characterize the subject matter of content items.

In other aspects of the present disclosure, the content recommendation processing computer 301 may determine/identify a plurality of metadata tag values that have been annotated to content items made available to users for consumption. In such instances, the plurality of existing metadata tag values associated with content items on the content server may comprises a subset of the universe of available metadata tag values that may be used to characterize a content item. As described above, a user (or a system administrator) may have the option of creating a new metadata tag values for a particular metadata field of a content item. For example, the user may be prompted via a user interface (e.g., electronic program guide) to create a new metadata tag value for a content item by providing input characterizing the subject matter and/or a metadata field of the content item. The content recommendation processing computer 301 may receive textual data characterizing the subject matter of the content item, and may generate a metadata tag value based on the textual data. In this example, a user may characterize the genre of a content item as "Paranormal Romance," and the content recommendation processing computer 301 may generate a new metadata tag value, named "Paranormal Romance," that may be used to describe the genre of content items. At step, 503, the content recommendation processing computer 301 may store the newly created metadata tag value in memory, a database, or other suitable storage means for subsequent use by the content recommendation processing computer 301.

In some aspects of the present disclosure, a content service provider may not desire to assign metadata tag values to content items when the tag values have rarely been used to describe other content items. Metadata tag values that have been used to characterize a limited number of content items may be associated with obscure and/or narrow subject matter, and as such, may not provide the best indication of the subject matter of a content item. For example, a metadata tag value of "men walking past each other while riding flamingos" within a genre metadata field of a content item may accurately describe the genre and subject matter of a limited number of content items, but would likely fail to describe a large set of content items. The content recommendation processing computer 301 may receive input, from an input device, indicating parameters for a metadata tag value. These parameters may be configured to restrict which metadata tag values are considered and/or retrieved by the content recommendation processing computer 301. For example, the content service provider may desire that the content recommendation processing system exclude metadata tag values that have not been annotated or assigned to a minimum threshold number of content items. For example, the content recommendation processing computer 301 may receive a parameter indicating that the threshold minimum number of content items is a value within the range of four (4) to sixteen (16) content items. Any threshold number of minimum metadata tag annotations/assignments may be utilized by the content recommendation processing computer 301 when determining which metadata tag values to consider/retrieve from a database. In some instances, a computing device may push parameters for particular metadata tag values to content recommendation processing computer 301, such as a parameter indicating the minimum threshold number of content items. Alternatively, the content recommendation processing computer 301 may receive a parameter for a metadata tag value from a computing device in response to a request.

As discussed above, a content service may offer a user a plurality of content items for consumption. To more efficiently organize the content items in a manner that is easily comprehended by the user, content items may be characterized by content characteristics embodied by their respective metadata fields and tag values. However, each content item available to a user may include only a fraction of the possible metadata tag values utilized by the content recommendation processing system to characterize the subject matter and/or aspects of a content item. Additionally, applicability scores may be assigned to an even smaller subset of metadata tag values (if any) for new and/or available content items. This is particularly relevant within the context of sparsely-viewed or new content items, which may have fewer metadata (and/or assigned applicability scores), as compared to content items that have been made available for consumption to users over an extended period of time and/or have been consumed more frequently by a larger number of users. Accordingly, the content recommendation processing system may need to identify content items that may require additional metadata.

In step 505, the content recommendation processing computer 301 may receive input identifying content items to annotate with metadata and/or applicability scores. The content recommendation processing computer 301 may receive input from a computing device, such as the client device 320, identifying one or more content items (or groups of content items) for which the content recommendation processing computer 301 may generate metadata tag values and/or assign corresponding applicability scores. For example, a content service provider planning to introduce new content items (e.g., newly-released movies, a new season of television show, etc.) may need to generate metadata tag values and/or applicability scores for new content items. As another example, a content service provider may identify a subset of content items currently available to users that do not have applicability scores, or available content items that have limited metadata. Accordingly, a system administrator may utilize an input device to provide input to the content recommendation processing computer 301 identifying those content items (e.g., new content items, content items having a low number of metadata tag values) that may require metadata tag annotations and/or applicability score assignments.

In some aspects of the present disclosure, a content service provider may not desire to provide metadata tag values and/or applicability score assignments to content items that have rarely been consumed by users and/or not consumed by a threshold number of users. Content items that have been rarely consumed may represent random/statistical outliers that do not provide the best indication of how similar that content item is to other content items. The content recommendation processing computer 301 may receive input indicating content item viewing parameters, which may be configured to restrict which content items are considered by the content recommendation processing system for metadata tag annotations and/or applicability score assignments. In some embodiments, the content service provider may desire the content recommendation processing system to exclude those content items that have not been consumed by more than eight (8) users. Any minimum threshold number of users that have viewed/consumed a content item may be utilized by the content recommendation processing system when determining which content items may require a metadata tag annotations and/or an applicability score assignment.

In still other aspects of the present disclosure, the content recommendation processing computer 301 may receive input identifying content items associated with a user content query. The content recommendation processing computer 301 may receive input from a computing device, such as the client device 320, identifying one or more content items (or groups of content items) related to a user content search. For example, a user may request via an electronic program guide (or other suitable interface) a listing of action movies available for consumption. The content recommendation processing computer 301 may receive the content query from the client device 320, and may query a content server for a plurality of content items that include a metadata field having a particular metadata tag value, such as an action metadata tag value. As will be discussed in more detail below, the content recommendation processing computer 301 may analyze content items responsive to a user content query (e.g., content items that include the action metadata tag value), and may generate updated metadata tag annotations and/or updated applicability score assignments for content items in accordance with the query. In other instances, the content recommendation processing computer 301 may generate updated metadata tag values and/or updated applicability score assignments for content items responsive to other user content queries and/or in response to other user events, such as consuming a threshold number of content items, indicating a content item preference, recording programming content, identifying new content items available for consumption, and the like.

In step 507, the content recommendation processing computer 301 may generate and/or retrieve similarity data for a plurality of content items. For example, the content recommendation processing computer 301 may generate and/or retrieve similarity data for content items identified at step 505. As discussed above, the content recommendation processing system may be configured to analyze user content consumption history data to determine similarities between content items consumed by a plurality of users. The content recommendation processing computer 301 may generate and/or retrieve similarity data (e.g., similarity values) for a plurality of content items from a similarity matrix, such as the similarity matrix described above with respect to FIG. 3B. In some embodiments, the content recommendation processing computer 301 may request from a computing device similarity data for a plurality of content times, such as the content items identified at step 505. In some instances, the computing device may push similarity data to the content recommendation processing computer 301. In other instances, the content recommendation processing computer 301 may receive similarity data from a computing device in response to a request. For example, the content recommendation processing computer 301 may provide the computing device, e.g., program similarity module 305, with identifiers for a first content item and a second content item, and the computing device may transmit to the content recommendation processing computer 301 similarity value between the first and second content items.

As will be discussed in more detail below, in some aspects of the present disclosure, the content recommendation processing computer 301 may utilize the similarity data and existing metadata information for content items (e.g., the content items identified at step 505), such that for any given content item and metadata tag value, the content recommendation processing computer 301 may compute an applicability score indicating a degree of suitability for annotating the content item with the metadata tag value. As discussed above, the applicability score for a content item and metadata tag value may represent a level of similarity between the content item and a subset of content that also have been assigned the particular metadata tag value.

As previously noted, a determined similarity value (and/or a similarity value retrieved from a similarity matrix) may fall within a wide range of values, and the content recommendation processing computer 301 may be configured to adjust/normalize determined similarity values and/or similarity values stored in or retrieved from a similarity matrix. For example, rather than determining "ratio(p,q)" (i.e., the ratio of the fraction/proportion of total users that have consumed a first content item (p) and a second content item (q) to the fraction/proportion of users that have consumed the second content item), the content recommendation processing computer 301 may determine a similarity value between the two content items using a probability difference, which may be expressed as:

$$\text{delta}(p,q)=P(q|p)-P(q)$$

or:

$$\text{delta}(p,q)=P(q)\cdot(\text{ratio}(p,q)-1)$$

In other aspects of the present disclosure, the content recommendation processing computer 301 may adjust and/or modify a similarity value between two content items based on other information, such as similarities in the textual descriptions of the content items. For example, in some embodiments, the content recommendation processing system (and/or another suitable computing device) may analyze closed caption information, abstract information, program description information, and other textual information associated with a content item to determine whether two programs are similar. In one of these embodiments, the content recommendation processing system may utilize a natural language processor (and/or any other suitable linguistic processor) to analyze the textual information associated with a content item. The content recommendation processing system may be configured to determine similarities between content items using the results of the textual analysis.

In still other aspects of the present disclosure, the content recommendation processing computer 301 may adjust and/or modify a similarity value between two content items based on similarities in video/visual data of two content items. In some embodiments, the content recommendation processing computer 301 (and/or another suitable computing device) may analyze video/visual data associated with a content item to determine similarity between two content items. In one of these embodiments, the content recommendation processing system may utilize a specially-programmed video processor, such as a processor in content recommendation processing 301 (and/or any other processor capable of analyzing video data for relevant content), to analyze the video/visual data of a content item. The content recommendation processing system may utilize the specially-programmed video processor to analyze video data for content items with reference to profile information to select segments of interest within the content item that are associated with predetermined events of significance signifying that the content item is associated with a particular metadata tag value. For example, identifying predetermined events (e.g., events corresponding to explosions, gun shots, car chases and the like), within video data for a first content item may infer that the first content item is associated with an action metadata tag value. Accordingly, the content recommendation processing computer 301 may modify/adjust upward the similarity value between the first content item and another content item annotated with an action metadata tag value and/or another content item having a threshold applicability score for the action metadata tag value. Various types of identifying events may be utilized by the content recommendation processing system to identify corresponding metadata tag values and/or metadata fields for a content item based on video data associated with the content item without departing from the scope of the present disclosure.

At step 509, the content recommendation processing computer 301 may begin a loop that is performed for one, some, or all of the content items identified at step 505. For example, a system administrator may desire to conduct a large-scale expansion of metadata tag values for a plurality of content items stored on a server in order to replace/supplement metadata, confirm existing metadata annotations, and/or to generate metadata tag annotations for the plurality of content. As will be explained in more detail below, as a result of the looping in steps 509, 512, and 513, the content recommendation processing computer 301 may generate, for each content item ("P") analyzed at step 509, a separate applicability score (denoted "weight(p,t)") may be generated for each metadata tag value ("T") available to describe/characterize a metadata field of content item P. The content recommendation processing computer 301 may utilize an applicability score determined for the metadata tag value and content item to assess the suitability of annotating the content item with the particular metadata tag value.

At step 511, the content recommendation processing computer 301 may determine a plurality of content items that are similar to the content item being analyzed at step 509. The content recommendation processing computer 301 may utilize similarity data retrieved (and/or generated) at step 507 to determine whether one or more content items are similar to the content item being analyzed at step 509. The content recommendation processing computer 301 may determine the plurality of content items that are similar to the content item being analyzed at step 509 in a manner similar to step 420. As discussed above, the content recommendation processing computer 301 may determine that a first content item is similar to the content item being analyzed at step 509 when a similarity value between the first content item and the content item being analyzed at step 509 satisfies a predetermined threshold value.

At step 512, the content recommendation processing computer 301 may begin a loop that is performed for a plurality of metadata fields. In some embodiments, the computer 301 may begin a loop that is performed for one, some, or all metadata fields retrieved at step 503. For example, a system administrator may desire to update metadata tag values for one, some, or all metadata fields of the content items received at step 505. The content recommendation processing computer 301 may receive input from a system administrator identifying the metadata fields to which generated metadata tag values should be assigned/annotated. In other instances, the content recommendation processing computer 301 may generate metadata tag values for all available metadata fields of a content item.

At step 513, the content recommendation processing computer 301 may begin a loop that is performed for a plurality of metadata tag values. In some embodiments, the computer 301 may begin a loop that is performed for one, some, or all of the metadata tag values determined (and/or retrieved) at step 503. The content recommendation processing system may determine a universe of metadata tag values available for annotating content items. In some instances the content recommendation processing system may determine a plurality of metadata tag values available to characterize the metadata field being analyzed at step 512. In some aspects of the present disclosure, the content recommendation processing system may be configured to exclude from consideration those metadata tag values that have not been assigned to (and/or associated with) a threshold number of content items. For example, the content recommendation processing system may exclude from consideration metadata tag values that have not been annotated to (and/or associated with) at least 4 content items. Any number of minimum content items may be utilized by the content recommendation processing system when determining which metadata tag values to exclude from consideration without departing from the scope of the present disclosure.

At step 517, the content recommendation processing computer 301 may determine/generate an applicability score for the metadata tag value being analyzed at step 513. The content recommendation processing computer 301 may determine an applicability score for the metadata tag value and the content item being analyzed at step 509 in a manner similar to step 440. To determine the applicability score, the content recommendation processing computer 301 may be configured to determine a similarity factor and a tag factor for the metadata tag value and the content item in a manner similar to steps 420 and 430, respectively.

At step 518, the content recommendation processing computer 301 may determine whether the applicability score determined at step 517 satisfies a threshold value. As noted above, given that the applicability score for a particular metadata tag value and content item indicates the degree of similarity between the content item and other content items that have also been annotated with the particular metadata tag, the content recommendation processing computer 301 may determine the appropriateness or applicability of annotating the content item with the particular metadata tag value based on the determined applicability score. The content recommendation processing computer 301 may determine whether to apply and/or annotate the metadata tag value (being analyzed at step 513) to the content item (being analyzed at step 509) by comparing the applicability score determined for the metadata tag value and the content item pairing to a threshold value.

For example, when determining whether to assign a comedy metadata tag value to the genre metadata field of a movie, the content recommendation processing computer 301 may compare the applicability score for the comedy metadata tag value and movie to a minimum threshold applicability score. In response to a request from the content recommendation processing computer 301, another computing device may push data indicating a minimum threshold applicability score for determining whether to annotate a content item with a metadata tag. In other aspects of the present disclosure, the content recommendation processing computer 301 may receive input (e.g., input from a system administrator) identifying a minimum threshold applicability score. Various threshold values may be utilized by the content recommendation processing computer 301 when determining whether to annotate a content item with a metadata tag value without departing from the scope of the present disclosure. For example, the content recommendation processing computer 301 may utilize a first threshold for assessing whether to annotate content items with a first metadata tag value (e.g., horror) and may utilize a different threshold for assessing whether to annotate the content items a second metadata tag value (e.g., comedy).

Additionally or alternatively, the content recommendation processing computer 301 may determine whether the determined applicability score satisfies a preliminary threshold applicability score. The preliminary threshold applicability score may be used to determine whether an applicability score is statistically significant for consideration by the content recommendation processing system. In some instances the content recommendation processing computer 301 may be configured to exclude from consideration those applicability scores that do not exceed a preliminary threshold value. For example, the content recommendation processing computer 301 may exclude from consideration applicability scores that fall below 0.001. In this example, the content recommendation processing computer 301 may determine that applicability scores below 0.001 represent a statistically random outlier and should not be assigned to and/or associated with a particular metadata tag value and content item. Although not depicted in FIG. 5, if the content recommendation processing computer 301 determines that the applicability score determined at step 517 fails to satisfy the preliminary threshold value, the method may proceed to step 513. If the content recommendation processing computer 301 determines that the applicability score determined at step 517 satisfies the preliminary threshold value, the content recommendation processing computer 301 may compare the applicability score determined at step 517 to a second threshold as described above (e.g., comparing the applicability score to a threshold value to determine whether to apply and/or annotate the metadata tag value to a content item). Various minimum threshold applicability scores may be utilized by the content recommendation processing system when determining which generated applicability scores should be assigned to a metadata tag value and content item without departing from the scope of the present disclosure.

At step 518, if the applicability score determined at step 517 satisfies the threshold, then the method may proceed to step 519 where the content recommendation processing computer 301 may annotate/apply the metadata tag value being analyzed at step 513 to the metadata field (being analyzed at step 512) of the content item being analyzed at step 509. The content recommendation processing computer 301 may annotate and/or associate the metadata tag value with a metadata field of a content item in various manners without departing from the scope of the present disclosure. For example, the content recommendation processing computer 301 may store data indicating the metadata tag value in data field (e.g., metadata field) of a content item. Additionally or alternatively, the content recommendation processing computer 301 may store the metadata tag value in a database, and may be configured to associate within the database the metadata tag value and the metadata field of the content item. The content recommendation processing computer 301 may store the applicability score determined at step 517 in memory or any other suitable storage means. For example, the content recommendation processing computer 301 may store the applicability score in a database (e.g., database 303). In some embodiments, the content recommendation processing computer 301 may transmit to a computing device the applicability score determined at step 517.

As discussed above with respect to steps 518 and 519, in some aspects of the present disclosure, the content recommendation processing computer 301 may propose or recommend a metadata tag value to be assigned to a metadata field of a content item when an applicability score generated for the metadata tag score exceeds a threshold value. Additionally or alternatively, the content recommendation processing computer 301 may generate an alert to assign a metadata tag value to a metadata field of a content item when an applicability score generated for the metadata tag value exceeds a threshold value. For example, the content recommendation processing computer 301 may generate an alert (and/or other suitable notification, communication, etc.) indicating that a generated applicability score for a metadata tag value exceeds the predetermined threshold value. The content recommendation processing computer 301 may prompt a system administrator to assign and/or associate the metadata tag value with the content item. Additionally or alternatively, the content recommendation processing computer 301 may assign and/or associate the metadata tag value with the content item.

In other aspects of the present disclosure, the content recommendation processing computer 301 may propose or recommend one or more metadata tag values to be assigned to a content item utilizing a sorting/ranking of applicability scores. In some embodiments, the content recommendation processing computer 301 may be configured to sort/rank metadata tag values by applicability scores for a particular metadata field of a content item. For example, the content recommendation processing computer 301 may rank applicability scores for metadata tag values (e.g., horror, action, comedy, drama, etc.) within the genre metadata field of a content item. The content recommendation processing computer 301 may be configured to identify one or more metadata tag values having the highest generated applicability scores for the particular metadata field of the content item, and may be further configured to generate a notification or communication recommending that one or more of the identified metadata tag values be assigned to and/or associated with the content item.

For example, as shown below, Table 1 depicts several metadata tag values and corresponding applicability scores generated by the content recommendation processing computer 301 for four different metadata fields of the movie Shrek (i.e., genre, tone, theme, and keyword). As context, the movie Shrek is a computer-animated film where an ogre's peaceful world is upended by the invasion of magical creatures who were banished from their lands by a villainous lord. To save their land, and his, the ogre agrees to rescue a princess from the villainous lord and take back the kingdom.

As further shown in Table 1, the metadata tag values in bold represent existing metadata tag values that were already assigned to and/or associated with the movie Shrek, for example, metadata tag values that were manually assigned to the content item by system administrators.

TABLE 1

| Genre | Theme | Tone | Keyword |
|---|---|---|---|
| Animated 0.2693 | Imaginary Kingdom 0.0708 | Fanciful 0.0872 | Friendship 0.0696 |
| Family Ent. 0.2519 | Daring Rescue 0.0614 | Humorous 0.0851 | Hero 0.0498 |
| Children Ent. 0.2045 | Fantasy Land 0.2693 | Rousing 0.0475 | Danger 0.0461 |
| Fantasy 0.1142 | Heroic Mission 0.2693 | Stylized 0.0279 | Partner 0.0266 |
| Action/Adventure 0.0652 | Curses & Spells 0.2693 | Witty 0.0081 | Fantasy-World 0.0231 |
| Comedy 0.0596 | Fall in Love 0.2693 | Quirky 0.00667 | Pop Culture 0.0090 |
| Adaption 0.0105 | Opposites Attract 0.2693 | Sentimental 0.0047 | Dragon 0.0010 |

As shown above, the content recommendation processing computer 301 may be configured to rank/sort by applicability score the metadata tags for a metadata field of the movie Shrek. As shown above, several metadata tag values available to characterize/describe the movie Shrek were not previously assigned to the content item by system administrators. The content recommendation processing computer 301 may be configured to recommend one or more metadata tag values be assigned to and/or associated with the "genre" metadata field of the movie Shrek that have not been previously assigned to the content item.

In some embodiments, the content recommendation processing computer 301 may be configured to assign metadata tag values to the genre metadata field of the movie Shrek that exceed a predetermined threshold applicability score, in a similar manner as step 518. For example, referring to Table 1 above, the content recommendation processing computer 301 may not assign metadata tag values (within the genre metadata field) to the movie Shrek if the generated applicability score for the metadata tag fails to exceed 0.1000. In this example, the content recommendation processing computer 301 may recommend assigning the "Family Entertainment" and "Fantasy" metadata tag values to the genre metadata field of the movie Shrek, given that the "Children Entertainment" and "Fantasy" metadata tag values have already been assigned to the movie. Various threshold applicability scores may be utilized by the content recommendation processing computer 301 when determining which metadata tag values to recommend assigning to a content item without departing from the scope of the present disclosure. In some embodiments, the content recommendation processing computer 301 may receive user input indicating a threshold applicability score for one or more content items and/or corresponding metadata field. In one of these embodiments, a user may interact with an interface element (e.g., a slider, menu, etc.) of an electronic program guide and/or other suitable user interface to indicate the threshold applicability score for recommending that a metadata tag value be assigned to a content item. As will be described in more detail below with respect to FIG. 7, the content recommendation processing computer 301 may utilize rankings of metadata tag applicability scores to determine content recommendations for users and/or to affect the order of content items presented to a user in an electronic program guide.

In some aspects of the present disclosure, the content recommendation processing computer 301 may be configured to recommend assigning to a content item a threshold number of the highest ranked metadata tag values for a particular metadata field based on generated applicability scores. For example, referring back to Table 1 above, the content recommendation processing computer 301 may recommend assigning the movie Shrek the four (4) highest-ranked metadata tag values for each metadata field. In this example, the content recommendation processing computer 301 may generate a notification or communication recommending that the "Imaginary Kingdom" and "Daring Rescue" metadata tag values be assigned to the "theme" metadata field of the movie Shrek, given that the "Fantasy Land" and "Heroic Mission" metadata tag values have already been assigned to the "theme" metadata field for the movie Shrek.

If the applicability score determined at step 517 satisfies the threshold, then the method may proceed to step 513 to continue the loop until each metadata tag value has been processed by the content recommendation processing computer 301. The content recommendation processing computer 301 may generate and/or assign applicability scores for all available metadata tag values associated with the metadata field being analyzed at step 512. In some aspects of the present disclosure, at step 513, the method may continue the loop until one, some, or all of the metadata tag values determined (and/or retrieved) at step 503 have been processed. When all of the metadata tag values have been processed, the method may return to step 512 to continue the loop until each of the plurality of metadata fields have been processed by the content recommendation processing computer 301. At step 512, the content recommendation processing computer 301 may generate applicability scores and/or assign metadata tag values to all available metadata fields for the content item being analyzed at step 509. In some aspects of the present disclosure, at step 512, the method may continue the loop until one, some, or all of the metadata fields determined (and/or retrieved) at step 503 have been processed. When all of the metadata fields have been processed, the method may return to step 509 to continue the loop until each of the plurality of content items have been processed.

As discussed above, one or more content items made available to users for consumption may already include existing metadata. For example, a user or system administrator may have manually annotated one or more content items (e.g., newly-released content items) with metadata, such as metadata fields and corresponding metadata tag values. Rather than generate new metadata for a content item, a service provider or system administrator may desire to confirm/assess the applicability of existing metadata for content items. For example, the service provider may want to asses/confirm whether a horror metadata tag value currently assigned to a content item is appropriate.

Furthermore, as a content item is consumed by a larger number of users, the service provider may receive feedback from users regarding the appropriateness/applicability of a metadata tag value assigned to a content item. The service provider may desire to update or modify metadata tag values for content items based on such user feedback. As discussed above, the similarity between a first content item and a second content item may be based in part on the number of users that consumed a first item and a second item and the fraction of users that consumed the second item. Thus, as additional users become members of a content service and as the content consumption/preferences for new and existing users change over time, the applicability score for a metadata tag value and content item may also vary over time.

Figure 6:
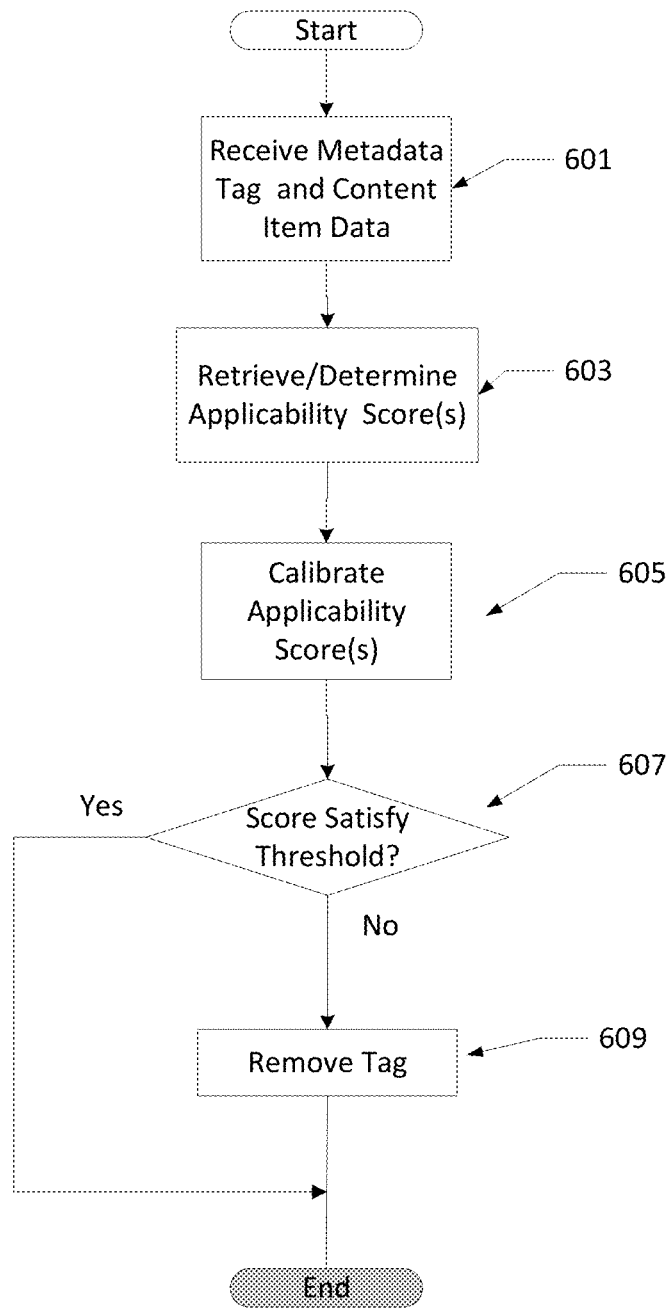
FIG. 6 shows an exemplary flowchart of a process for calibrating metadata and applicability scores for content according to one or more illustrative aspects of the disclosure.

FIG. 6 shows an exemplary flowchart of a process for calibrating applicability scores and updating metadata tag values for content items according to one or more illustrative aspects of the disclosure. As will be discussed in further detail below, the content recommendation computer 301 may be configured to update and/or calibrate applicability scores based on feedback data, and may be further configured to utilize applicability scores to determine whether existing metadata information for a content item is still applicable and/or appropriate. The steps shown in FIG. 6 may be performed by a content recommendation processing system (e.g., by content recommendation processing system 300 described above with respect to FIG. 3A). For example, the steps may be implemented by the content recommendation processing system computer 301. For brevity, the following description will generally assume that the steps shown in FIG. 6 are performed by content recommendation processing computer 301.

In step 601, the content recommendation processing computer 301, may receive information identifying a metadata tag value and a content item. As will be described in more detail below, the content recommendation processing computer may determine and/or retrieve an applicability score based on the metadata tag value and content item. In some instances, a computing device may push an identifier for a content item and/or a metadata tag value to the content recommendation processing computer 301. Alternatively, content recommendation processing computer 301 may receive an identifier for a metadata tag value and/or a content item from a computing device in response to a request. For example, a user or system administrator may request the content recommendation processing computer to determine an applicability score for a particular metadata tag and content item by entering a command via an input device. The content recommendation processing computer 301 may receive data identifying a plurality of metadata tags and corresponding content items.

In step 603, the content recommendation processing computer 301 may determine and/or retrieve an applicability score for the metadata tag value(s) and content item(s) received/identified at step 601. The content recommendation processing computer 301 may determine an applicability score for the metadata tag value and content item in a similar manner as in step 517. In some instances, a computing device may push an applicability score for the metadata tag value and content item to the content recommendation processing computer 301. In other instances the content recommendation processing computer 301 may receive from a computing device an applicability score for the metadata tag value and content item in response to a request.

At step 605, the content recommendation processing computer 301 may calibrate applicability score(s) for the metadata tag value(s) and content item(s) determined at step 601. As discussed above, over time, the content recommendation processing computer 301 may receive and/or collected feedback data from users indicating content preferences, and the content recommendation processing computer 301 may be configured to adjust applicability scores for metadata tag values based on the collected information. In some aspects of the present disclosure, the content recommendation processing system may receive input indicating an accuracy (or correctness) of metadata tag values that have been assigned to content items, such as tag values that have been manually assigned to a content item and/or tag values that have been assigned to content items in a similar manner as steps 509-519. For example, a content provider may retrieve user feedback via a user interface (e.g., electronic program guide) indicating an accuracy of metadata tag values assigned to one or more metadata fields of a content item. In this example, the user may be prompted to identify whether a first metadata tag value accurately reflects the subject matter of an available (and/or consumed) content item. In another example, the content recommendation processing computer 301 may generate and display to a user, via the user interface, a metadata tag recommendation for a particular content item. In other embodiments, the content recommendation processing computer 301 may transmit the metadata tag recommendation to a computing device, such as client device 320, a mobile computing device, and the like. The user may review the recommended/suggested metadata tag value, and provide feedback to the content recommendation processing system indicating whether the metadata tag value is correct and/or accurately reflects the subject matter of the content item. In still another example, the user may be prompted to identify and/or assign metadata tag values to a content item that accurately reflect the subject matter of the available (and/or consumed) content item.

In other aspects of the present disclosure, the content recommendation processing computer 301 may utilize the generated feedback to adjust the applicability score for a metadata tag value assigned to a content item by repeating one or more of steps 601 and 603. In other aspects of the present disclosure, the content recommendation processing computer 301 may be configured to dynamically update applicability scores for one or more metadata tags based on feedback received at the content recommendation processing computer 301. For example, in the instance that a user indicates that a first metadata tag value (e.g., "horror") does not accurately reflect a metadata field (e.g., "genre") of a content item, the content recommendation processing computer 301 may be configured to reduce the applicability score assigned to the horror metadata tag value for the content item by a threshold value or percentage. For example, the content recommendation processing computer 301 may reduce the applicability score assigned to the horror metadata tag value by 5 percent. In other aspects of the present disclosure, the applicability score of a user-assigned metadata tag value for a content item may be adjusted by the content recommendation processing computer 301 based on how many tag values have already been assigned to the content item. For example, in the instance that a user assigns a first metadata tag value (e.g., "action") to a metadata field (e.g., "genre") of a content item that does not having existing metadata and/or has not been previously annotated/associated with the particular metadata tag value (e.g., because the applicability score falls below a first threshold), the content recommendation processing computer 301 may be configured to increase the applicability score assigned to the action metadata tag value under the genre metadata field of the content item by a predetermined value. For example, the content recommendation processing computer 301 may increase the applicability score assigned to the action metadata tag value by 1 percent.

As discussed above, one or more content items analyzed by the content recommendation processing computer 301 may have been previously annotated with metadata tag values, for example, a system administrator may have manually assigned metadata tag values to one or more content items. The content recommendation processing computer 301 may be configured to replace previously annotated metadata tag information for a content item using applicability scores generated for the content item. For example, a first content item (e.g., "Aliens on the Moon") available to a user for consumption may have been previously annotated with five (5) metadata tag values (i.e., Documentary, Science Fiction, Horror, Thriller, and Comedy) for the genre metadata field of the first content item. In this example, the "Aliens on the Moon" content item has not been previously annotated with metadata tag values relating to other metadata fields (e.g., Theme, Tone, Keyword, etc.). The content recommendation computer 301 may determine whether additional metadata may be provided for the movie "Aliens on the Moon" by comparing the movie "Aliens on the Moon" to other content items and respective metadata tag values as described above in step 603 (as well as steps 505-519). For example, the content recommendation processing computer 301 may determine whether "Aliens on the Moon" is similar to one or more other content items having metadata fields and/or metadata tag values that have not been associated with and/or assigned to the movie "Aliens on the Moon." Accordingly, the content recommendation processing computer 301 may be configured to generate weight values for and assign metadata tag values to the "Aliens on the Moon" movie.

Table 2 shown below, depicts an example set of applicability scores generated by the content recommendation processing system for various metadata tag values associated with the movie "Aliens on the Moon":

TABLE 2

| Genre | Theme | Tone | Keyword |
|---|---|---|---|
| Science & Tech. 0.0506 | Space & Aliens 0.0094 | Tense 0.0049 | UFO 0.0100 |
| Documentary 0.0311 | Alien Encounter 0.0080 | Creepy 0.0045 | Alien 0.0078 |
| Space 0.0299 | Evil Aliens 0.0050 | Rousing 0.0033 | Danger 0.0068 |
| Paranormal 0.0289 | Space Travel 0.0039 | Deadly 0.0031 | Disaster 0.0058 |

TABLE 2-continued

| Genre | Theme | Tone | Keyword |
|---|---|---|---|
| Science Fiction 0.0274 | Save the World 0.0038 | Gruesome 0.0010 | Chaos 0.0051 |

Genre: Horror 0.0169
Genre: Thriller 0.0077
Genre: Comedy 0.0020

As shown in Table 2 above, only two of the five metadata tags originally assigned to the "Aliens on the Moon" movie (e.g., Documentary and Science Fiction) are within the top 5 applicability scores of metadata tag values within the genre metadata field. However, the content recommendation processing computer 301 has determined that several other metadata tag values within the genre metadata field for the movie "Aliens on the Moon" have higher applicability scores than the metadata tags originally assigned to the movie.

As will be explained in more detail below with respect to steps 607 and 609, the content recommendation processing computer 301 may be configured to remove one or more of the existing and/or previously annotated metadata tag values for the "Aliens on the Moon" movie based on applicability score threshold. Additionally or alternatively, the content recommendation processing computer 301 may be configured to replace one or more of the existing and/or previously annotated metadata tag values for the "Aliens on the Moon" with metadata tag values determined by the content recommendation processing system as better characterizing (e.g., having a higher applicability score) the subject matter and attributes of the movie. Furthermore, as shown above in Table 2, the content recommendation processing computer 301 has identified a plurality of metadata tags for the "Aliens on the Moon" content item under the metadata fields of Theme, Tone, and Keyword. The content recommendation processing computer 301 may be further configured to assign the generated metadata tags under the Theme, Tone, and Keyword metadata fields to the Aliens on the Moon" movie.

In still other aspects of the present disclosure, the content recommendation processing computer 301 may calibrate and/or adjust applicability scores for a metadata tag value assigned to a content item by utilizing previously annotated metadata tag value information for the content item. For instance, the content recommendation processing computer 301 may calibrate metadata tag applicability scores utilizing a set of verified metadata tag values. As discussed above, utilizing user content consumption habits and preferences to determine a level of similarity between content items may result in inaccuracies that become cumulative over time. Such errors may be limited by conducting periodic calibration and testing of metadata tag values generated by the computer 301 for content items. Periodic calibration of the content recommendation processing system utilizing human-verified metadata tag values may aid the content recommendation processing system in resetting and/or improving the accuracy of generated metadata tag values. In some embodiments, a content provider may utilize system administrators and/or other personnel to verify metadata tag values assigned to content items by the content recommendation processing computer 301.

For example, a system administrator may review a plurality of metadata tag values generated by the content recommendation processing computer 301 for one or more content items to confirm the appropriateness or applicability of the metadata tag annotation. The content recommendation processing computer 301 may utilize feedback from the system administrator to remove metadata tag annotations for a content item and/or to adjust applicability scores for a content item. As another example, the system administrator may introduce and/or add new content items to the plurality of content items available for consumption to users. The newly introduced content items may include (and/or have been manually assigned) metadata tags that accurately characterize the subject matter of the content items. The content recommendation processing computer 301 may determine updated applicability scores for the plurality of content items available for consumption to users, as described above in steps 503-519. If the content recommendation processing computer 301 determines that an existing applicability score for a metadata tag value differs from the updated applicability score, the content recommendation processing computer 301 may adjust the replace the existing applicability score with the updated score. In some embodiments, the content recommendation processing computer 301 may transmit a notification to the system administrator indicating a proposed adjustment to (or replacement of) the applicability score for the metadata tag value, and may be further configured to prompt the system administrator for feedback confirming the proposed score adjustment/replacement.

In other embodiments, the content recommendation processing computer 301 may receive input from a user indicating a correctness (and/or accuracy) for one or more metadata tag values generated by the content recommendation processing computer 301 for a content item. For example, a user may provide feedback via the electronic program guide (and/or other suitable user interface) indicating that a first metadata tag value, in the one or more metadata tag values generated by the system, has been incorrectly assigned to a particular content item. As another example, the user may provide feedback indicating a user preference that the first metadata tag not be associated with the particular content item. As yet another example, the user may provide feedback indicating a proposed or suggested weighting (e.g., applicability score) for the first metadata tag and the particular content item.

At step 607, the content recommendation processing computer 301 may determine whether an applicability score for the metadata tag value and content item received at step 603 satisfies a threshold value. The content recommendation processing computer 301 may compare an applicability score, such as a calibrated applicability score determined at step 605, to a threshold value to assess the applicability and/or appropriateness of the content item being annotated with metadata tag value. In some instances, a computing device may push the threshold value to the content recommendation processing computer 301. In other instances, the content recommendation processing computer 301 may receive from another computing device data indicating the predetermined threshold value in response to a request. In still other instances, the content recommendation processing computer 301 may receive input from a system administrator, via an input device, identifying the predetermined threshold value. Various threshold values may be utilized by the content recommendation processing computer 301 when determining whether to maintain and/or remove a metadata tag value from a metadata field of a content item without departing from the scope of the present disclosure.

At step 607, if the applicability score for the metadata tag value and content item does not satisfy the threshold value, the method may proceed to step 609 where the content recommendation processing computer 301 may remove the metadata tag value from a metadata field of the content item.

Referring back to the example in Table 2 above, when determining whether to remove and/or maintain a particular metadata tag value for the genre metadata field of the movie "Aliens on the Moon," the content recommendation processing computer 301 may compare the applicability score for the particular metadata tag value to a predetermined threshold value, such as 0.0150. In this example, the content recommendation processing computer 301 may compare the applicability score for the Science Fiction metadata tag value (i.e., 0.0274) to the threshold applicability score (i.e., 0.0150) to determine whether the Science Fiction metadata tag value is appropriate for the movie "Aliens on the Moon." In this example, the content recommendation processing computer 301 would determine that the Science Fiction metadata tag satisfies the threshold value, and thus, will maintain this particular metadata tag annotation for the movie. As another example, the content recommendation processing computer 301 may compare the applicability score for the Horror metadata tag value (i.e., 0.0077) to the threshold applicability score (i.e., 0.0150) to determine the Horror metadata tag value is not an appropriate metadata tag annotation for the movie "Aliens on the Moon." Accordingly, the content recommendation system may remove the Horror metadata tag value from the genre metadata field for the movie "Aliens on the Moon."

In some aspects of the present disclosure the content recommendation processing system may track the various metadata tag values that are removed from content items for a particular user over time. The content recommendation processing computer 301 may generate a history of metadata tag removals by storing in memory each instance of a metadata tag being removed from a content item. The content recommendation processing computer 301 may associate the removed metadata tag with the corresponding content item, and/or otherwise identify the corresponding content item from which the metadata tag was removed. The content recommendation processing computer 301 may utilize this history of metadata tag removals along with a content consumption history of the user to generate and our modify user content recommendations and preferences. For example, the content recommendation processing computer 301 may determine that several movies previously consumed by the user have had a particular metadata tag (e.g., horror metadata tag) removed within a recent time period (e.g., the last week, month, three months, etc.). Additionally or alternatively, the content recommendation processing computer 301 may analyze previously consumed content items for which the user has indicated a content preference, such as by providing a high ranking, a thumbs-up, or any other suitable preference indication, when determining which content items have had a metadata tag removed.

In some embodiments, the content recommendation processing computer 301 may transmit a communication to the user indicating that the horror metadata tag has been removed from a threshold number of content items. Additionally or alternatively, the content recommendation processing computer 301 may prompt the user to adjust user content preferences, such as reducing the relevance of horror movies when recommending content items, given that a threshold number of horror metadata tags were recently removed from content items consumed by the user. In some instances, the content recommendation processing computer 301 may automatically adjust user content preferences based on the history of metadata tag removals. In some embodiments, the content recommendation processing computer 301 may adjust and/or calibrate content recommendations to the user based on the history of metadata tag removals.

Referring to the example above, when determining a content recommendation for the user, the content recommendation processing computer 301 may reduce the relevance of those content items annotated with horror metadata tag values comprising high applicability scores (e.g., applicability scores satisfying a score threshold). For example, as will be discussed in more detail below, the content recommendation processing computer 301 may reduce a composite recommendation value for one or more content items with horror metadata tag values satisfying a threshold applicability score.

In other aspects of the present disclosure, as discussed above, the content recommendation processing system may replace the horror metadata tag value with another metadata tag value that has yet to be annotated to the movie "Aliens on the Moon." Referring to the example above, the content recommendation processing computer 301 may identify a metadata tag value that has yet to be annotated to the movie "Aliens on the Moon," such as the Paranormal metadata tag value, and may compare the applicability score for the particular metadata tag value to the predetermined threshold value. In this example, the content recommendation processing computer 301 may compare the applicability score for the Paranormal metadata tag value (i.e., 0.0289) to the threshold applicability score (i.e., 0.0150) to determine whether the Paranormal metadata tag value is appropriate for the movie "Aliens on the Moon." In this example, the content recommendation processing computer 301 would determine that the Paranormal metadata tag satisfies the threshold value, and thus, may assign this particular metadata tag value to the genre metadata field of the movie. Additionally or alternatively, the content recommendation processing system may modify the genre metadata field of the movie "Aliens on the Moon" to replace the Horror metadata tag value, which fails to satisfy the applicability score threshold value, with the Paranormal metadata tag value. The content recommendation processing computer 301 may transmit an alert or other suitable communication to a computing device indicating any modifications to a metadata field or metadata tag value for a content item. Referring to the examples above, the content recommendation processing computer 301 may transmit a communication to a system administrator indicating that the Science Fiction metadata tag value has been assigned to the genre metadata field for the movie "Aliens on the Moon." As another example, the content recommendation processing computer 301 may transmit a communication to a user indicating that the Horror metadata tag value can been removed from (and/or disassociated with) the genre metadata field for the movie "Aliens on the Moon." Additionally or alternatively, the content recommendation processing computer 301 may transmit a communication to the user indicating that the Paranormal metadata tag value has or may replace the Horror metadata tag value in the genre metadata field for the movie "Aliens on the Moon."

In still other aspects of the present disclosure, as discussed above, the content recommendation processing computer 301 may receive feedback from a user indicating whether a metadata tag annotation for a content item is accurate and/or appropriate. In some instances, the content recommendation processing computer 301 may prompt the user for feedback when transmitting an alert or communication indicating a change to a metadata tag value for a content item. Referring to the example above, the content recommendation processing computer 301 may prompt the user to provide feedback as to the appropriateness of removing the Horror metadata tag value for the movie "Aliens on the Moon" when transmitting a notification indicating a proposed change to the Horror metadata tag value for the movie. As an example, the notification indicating a proposed change to Horror metadata tag value may prompt the user to provide feedback, such as by prompting the user to confirm whether the Horror metadata tag value should be removed. In some instances, the content recommendation processing computer 301 may prompt the user for feedback before modifying the metadata field of a content item to remove a metadata tag value. After receiving the user feedback, the content recommendation processing computer 301 may calibrate the applicability score for one or more metadata tag values, as described above in step 605. The content recommendation processing computer 301 may be configured to perform one or more of steps 605-609 after receiving the user feedback. Referring to the example above, the content recommendation processing computer 301 calibrate the applicability score for the Horror metadata tag and may determine whether the calibrated score satisfies the threshold value, as described in step 607.

As discussed above with respect to FIGS. 4B, 5 and 6, the content recommendation processing computer 301 may be configured to generate an applicability score for a metadata tag value and a content item indicating a degree of suitability for annotating a content item with a metadata tag value. In additional aspects of the present disclosure, the content recommendation processing computer 301 may be configured to generate content recommendations based at least in part on applicability scores determined for metadata tag values of various content items that are available for consumption to users.

Figure 7:
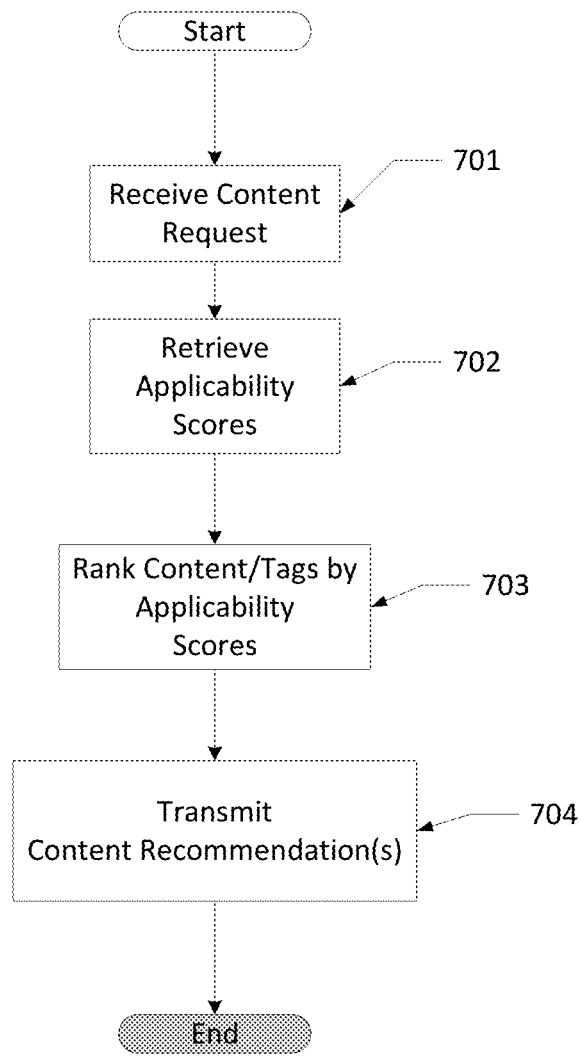
FIG. 7 shows an exemplary flowchart of a process for generating content recommendations based on determined applicability scores according to one or more illustrative aspects of the disclosure.

FIG. 7 shows an exemplary flowchart of a process for generating user content recommendations and calibrating metadata tag values for a content recommendation processing computer 301 according to one or more illustrative aspects of the disclosure. As discussed above, a user may utilize an electronic program guide and/or other suitable user interface to browse and consume content items. A user may query the electronic program guide for content recommendations, such as requesting a list of horror movies that are available for consumption, and/or requesting a list of content items that are similar to a particular movie. The content recommendation processing computer 301 may be configured to utilize applicability scores for a metadata tag value and content item to more efficiently and accurately determine the appropriate content items to present to a user in response to a content query. Further, as more content items are made available to users for consumption and as users provide feedback on the their content preferences and the accuracy of assigned applicability scores, an improved content recommendation computer 301 configured to generate and provide content recommendations in accordance with the determined applicability scores is disclosed herein.

The steps shown in FIG. 7 may be performed by a content recommendation processing system (e.g., by content recommendation processing system 300). For example, the steps may be implemented by content recommendation processing computer 301. The steps may also be implemented by a distributed computing system, having devices at various locations. One or more computing devices may be implemented as a computing device using the structure shown in FIG. 2, and may be configured to respond to user requests for content, such as streaming video or audio. For brevity, the following description will generally assume that the steps shown in FIG. 7 are performed by content recommendation processing computer 301.

In step 701, the content recommendation processing computer 301 may be configured to receive a content request/query. The content recommendation processing computer 301 may receive a content request or query from a computing device (e.g., client device 320). A user may utilize a user interface, such as an electronic program guide, to browse content items and to initiate a content request or query for content items. For example, a user may request the user interface to display a listing of horror movies that are available for consumption. In this example, the content recommendation processing computer 301 may receive, from the client device 320, a content request for all horror movies that are available for the user to consume. As another example, a user may request the user interface to display a listing of movies that are similar to the movie Shrek. The content recommendation processing computer 301 may receive, from the client device 320, a content request for a listing of available movies that are similar to the movie Shrek. As discussed above, there are a variety of ways in which the content recommendation processing computer 301 may determine that two content items are similar. For example, a similarity between two content items may be express by the ratio of the number of users that like a first item and a second item to the expected number of users that like the first item and the second item. Additionally or alternatively, a level of similarity between two content items may be determined and/or adjusted based on a comparison of metadata fields, metadata tag values and corresponding applicability scores between the two content items.

In step 702, the content recommendation processing computer 301 may be configured to retrieve one or more applicability scores in response to the content request received at step 701. The content recommendation processing computer 301 may analyze the content request received at step 701 and may be configured to identify one or more content items responsive to the content request. For example, in response to a user request to view a listing of action movies, the content recommendation processing computer 301 may identify a plurality of content items that include an action metadata tag value. As another example, in response to a user request to view a listing of content items that are similar to a particular movie (e.g., a target content item), the content recommendation processing computer 301 may analyze the target item to determine the one or more metadata fields and tag values that define the target content item, and may identify a plurality of content items that include the same metadata fields and/or metadata tag values as the target content item. The content recommendation processing computer 301 may retrieve applicability scores of metadata tag values for one or more content items responsive to the user's content request. The content recommendation processing computer 301 may retrieve/generate applicability scores of metadata tag values in a similar manner as steps 517 and 603.

At step 703, the content recommendation processing computer 301 may rank and/or sort metadata tag values for one or more content items based on applicability scores. As discussed above, an applicability score generated for a metadata tag value and content item may indicate a level/degree of similarity between the content item and a plurality of other content items that have been annotated with the particular metadata tag value. In some aspects of the present disclosure, the content recommendation processing computer 301 may rank and/or sort a plurality of metadata tag values by applicability score for a particular metadata field of a content item (e.g., genre, theme, tone, etc). Accordingly, by ranking metadata tag values of content items by applicability score, the content recommendation processing computer 301 may identify those content items whose subject matter and/or content characteristics best represent/embody a particular metadata tag value. For example, a movie having the highest applicability score for a horror metadata tag value may indicate that his movie best represents/embodies the characteristics and attributes of the prototypical horror movie.

Additionally or alternatively, the content recommendation processing computer 301 may be configured to rank/sort content items based on respective metadata tag values and corresponding applicability score. As discussed above, a user may query a user interface to identify content items similar to a target content item. In such instances, the content recommendation processing computer 301 may analyze the metadata fields and tag values of the target content item to identify other content items available for consumption that comprise similar metadata fields and metadata tag values. In some aspects of the present disclosure, for each metadata tag value within a metadata field of the target content item, the content recommendation processing computer 301 may be configured to rank/sort the identified content items by applicability score that most closely approximates (and/or has the smallest deviation from) the applicability score of the metadata tag value for the target content item.

The first column of Table 3 (below) shows an example listing of content items (and respective applicability score) that have been identified by content recommendation computer 301 as comprising similar metadata fields (i.e., "genre") and metadata tag values (e.g., action and comedy) as a target content item, the action movie "Total Recall."

TABLE 3

Target Content Item: Total Recall
Weighting Score for Action Tag: 0.5200
Weighting Score for Comedy Tag: 0.5000

| Content Item<br>Action Tag<br>Weight | Content Item<br>(sorted)<br>Action Tag<br>Weight | Content Item<br>(sorted)<br>Comedy Tag<br>Weight |
|---|---|---|
| Miami Vice<br>0.5600 | Interstellar<br>0.5250 | Anchorman<br>0.7600 |
| Beverly Hills Cop<br>0.5500 | Judgment Day<br>0.5100 | Pineapple Express<br>0.6500 |
| Transformers<br>0.5400 | Transformers<br>0.5400 | Old School<br>0.4600 |
| Interstellar<br>0.5250 | Beverly Hills Cop<br>0.5500 | Family Vacation<br>0.4500 |
| Judgment Day<br>0.5100 | Miami Vice<br>0.5600 | Beverly Hills Cop<br>0.4000 |
| Shrek<br>0.4100 | Shrek<br>0.4100 | Zoolander<br>0.3100 |
| Pineapple Express<br>0.1000 | Pineapple Express<br>0.1000 | Shrek<br>0.2100 |

In the event that the movie "Total Recall" has an action metadata tag value having an applicability score of 0.5200, the content recommendation processing computer 301 may rank/sort the identified content items by respective applicability scores of the action metadata tag value that are closest to the value of 0.5200. As shown in column 2 of Table 3, the movie Interstellar is ranked first as it has an applicability score of the action metadata tag value (i.e., 0.5250), which is closest to the applicability score of the action metadata tag value of the movie Total Recall Judgment Day is ranked second as its respective applicability score of the action metadata tag value only deviates from that of Total Recall by 0.0100, while the movie Transformers is ranked third because its respective applicability score of the action metadata tag value deviates from that of Total Recall by 0.0200.

As will be explained in more detail below, the content recommendation processing computer 301 may utilize the determined ranking/sorting of content items in view of the metadata fields and tag values of a target content item to generate user content recommendations.

At step 704, the content recommendation processing computer 301 may generate and/or transmit content recommendations to a user in view of the content request received at step 701. For example, if a user requested a listing of action movies available for consumption, the content recommendation computer 301 may identify those content items having the highest applicability scores for the action metadata tag value in view of the rankings/sorting determined at step 703, and may transmit the identified content items to the user. In some instances, the content recommendation processing computer 301 may identify a threshold number of content items having the highest applicability scores for a particular metadata tag value in view of the rankings/sorting determined at step 703.

As another example, if a user requested a listing of content items that are similar to a target item, the content recommendation computer 301 may identify those content items having metadata tag values and/or applicability scores that most closely correspond to the metadata tag values and/or applicability scores of the target item. Referring back to Table 3 above, in this example, in response to a user content request for more content items like the movie Total Recall (e.g., a target content item), the content recommendation processing computer 301 may recommend the movie Interstellar to the user. In some aspects of the present disclosure, the content recommendation processing computer 301 may analyze a plurality of metadata tag values and/or metadata fields for a target item to determine a content recommendation for the user. Referring to the example in Table 3 above, the second and third columns of the table identify content items that have applicability scores for action and comedy metadata tag values that are similar to the applicability scores for similar metadata tag values assigned to the movie "Total Recall," and the content items have been sorted by respective applicability scores that most closely approximate the corresponding applicability scores of the movie "Total Recall." For each metadata tag value associated with the target item (e.g., "Total Recall"), the content recommendation processing computer 301 may assign a recommendation score to the related content items based on their respective applicability score rank.

Referring to the example in Table 3, for content items in column 2 of the Table having applicability scores similar to Total Recall with respect to the action metadata tag, the content recommendation processing computer 301 may assign recommendation scores to the content items in their respective applicability score ranking. For example, the content recommendation processing computer 301 may assign a recommendation score of 100 to the movie Interstellar; 90 to Judgment Day; 80 to Transformers; 70 to Beverly Hills; 60 to Miami Vice and so forth. Similarly, for content items in column 3 of the Table having applicability scores similar to Total Recall for the comedy metadata tag, the content recommendation processing computer 301 may assign a recommendation score of 100 to the movie Old School; 90 to Family Vacation; 80 to Beverly Hills; 70 to Pineapple Express; 60 to Zoolander and so forth. The content recommendation processing computer 301 may generate a composite recommendation score for each content item based on a combination (and/or sum) of the respective recommendation scores determined for each metadata tag value and/or metadata field.

In the above example, the content recommendation processing computer 301 may determine the composite recommendation score for the movie Beverly Hills Cop by computing the average of the individual recommendation scores for the action and comedy metadata tag values, resulting in a composite recommendation score of 70 (i.e., (60+80)/2). The content recommendation processing computer 301 may be configured to recommend to a user the one or more content items having the highest composite recommendation score. Based on the example in Table 3, in response to a user requesting to view additional content items like the movie Total Recall, the content recommendation processing computer 301 may recommend to the user one or more content items having the highest composite recommendation scores, such as Beverly Hills Cop (65), Pineapple Express (55), and Shrek (45). Additionally or alternatively, the content recommendation processing system may be configured to receive and store user content preferences. A user may indicate a content preference by identifying one or more particular metadata fields and/or tag values that are most desirable to the user. The content recommendation processing computer 301 may be configured to adjust content recommendations based on user content preferences. For example, the user may indicate a preference for action and drama movies. In some embodiments, the content recommendation processing computer 301 may be configured to weight the recommendation score assigned to content items having metadata tag values that are preferred by the user.

In some aspects of the present disclosure, a user may browse a list of movie genres in an electronic program guide and may select an "action" menu to view a list of action movies available for consumption. In response to the user selection, the content recommendation processing system may display a listing of content items having the highest applicability scores for the action metadata tag. In some embodiments, the content recommendation processing computer 301 may identify one or more content items having the highest applicability scores for a particular metadata tag value as a favorite content item. The content recommendation processing computer 301 may utilize information indicating a favorite content item for a user to modify the display of content items and other information displayed in the user's electronic program guide. For example, the content recommendation processing system may visually emphasize (e.g., highlight, outline, bold, etc.) those content items that have been identified as a favorite content item for the user.

As discussed above, the content recommendation processing computer 301 may identify one or more metadata fields that comprise key indicators of user content preferences. For example, the content recommendation processing computer 301 may analyze user content preferences to determine that a user prefers comedy and horror movies more than action movies. As such, the content recommendation processing computer 301 may recommend content items to the user corresponding to those content items having the highest applicability scores for the comedy and horror metadata tag values. Similarly, the content recommendation processing computer 301 may recommend to a user those content items having a low applicability score for the action metadata tag value. Additionally or alternatively, the content recommendation processing computer 301 may deprioritize and/or suppress content recommendations transmitted to a user for those content items having high applicability scores for the action metadata tag value, and may be further configured to suppress and/or deprioritize content recommendations transmitted to a user for content items having low applicability scores for comedy and horror metadata tag values.

In still other aspects of the present disclosure, the content recommendation processing computer 301 my utilize metadata tag rankings determined at step 703 to affect the presented order and/or context of content items presented in a program guide. Referring to the example in Table 1 above, a first content item (e.g., "Shrek") may be annotated with both a "Children Entertainment" metadata tag value and an "Action" metadata tag value under the genre metadata field. An electronic program guide and/or other suitable user interface for accessing and consuming content may provide the user with an ability to search for content items corresponding to a particular metadata field of a content item (e.g., searching content based on genre, theme, keywords, etc.). For example, a user may search for content items that are "Action" movies. The electronic program guide may provide a listing of content items that fall under the category of "Action" movies. When displaying the resulting content items, a user may anticipate that content items presented toward the top of the results are most closely associated with the selected genre (e.g., action movies).

Although the movie Shrek has been annotated/tagged as an action movie, it may not be appropriate to display Shrek toward the top of the listing of action movies in the user interface. Accordingly, as discussed above, an applicability score for a particular metadata tag value and content item, as determined by the content recommendation processing computer 301, may be utilized to determine to what degree a content item is embodied/characterized by the particular metadata tag value, such that the content recommendation processing computer 301 (and/or a content provider) may adjust the ranking/order of content items when presenting the results of a user content request within the user interface. For example, the content recommendation processing computer 301 may identify the one or more content items having the highest applicability scores for a first metadata tag value (e.g., horror) under the genre metadata field, and may modify the presentation/display of content items within the user interface to prioritize/emphasize the one or more identified content items in response to a search query, such as a query for horror movies.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method, implemented by one or more computing devices, comprising:
   determining a first set of similarity values indicating levels of similarity between a first content item and a plurality of other content items;
   determining, based on the first set of similarity values, a first set of content items, of the plurality of other content items, satisfying a threshold level of similarity to the first content item;
   determining a second set of content items, wherein each of the content items of the second set comprises a content item, of the first set of content items, that is associated with a first metadata tag;

generating, based on levels of similarity between the first set of content items and the second set of content items, an applicability score for the first metadata tag and the first content item; and sending, to a user and based on the generated applicability score exceeding a threshold value, a recommendation of the first content item.

2. The method of claim 1, wherein the first set of similarity values comprises at least a first similarity value indicating a level of similarity between the first content item and another content item in the first set of content items.

3. The method of claim 1, wherein generating the applicability score further comprises:
determining a second set of similarity values indicating levels of similarity between the first content item and each content item of the first set of content items;
determining a third set of similarity values indicating levels of similarity between the first content item and each content item of the second set of content items; and
determining a first ratio of a sum of the third set of similarity values to a sum of the second set of similarity values.

4. The method of claim 3, wherein generating the applicability score further comprises:
determining a third set of content items, of the plurality of other content items, associated with the first metadata tag;
determining a second ratio of a number of content items in the third set of content items to a number content items in the second set of content items; and
determining a product of the first ratio and the second ratio.

5. The method of claim 1, wherein determining the first set of similarity values comprises determining, as a similarity value of the first set of similarity values, a ratio of:
a first proportion, of a quantity of users, that have consumed the first content item and a content item of the plurality of other content items, and
a second proportion, of the quantity of users, that have consumed the content item of the plurality of other content items.

6. The method of claim 1, wherein determining the first set of similarity values comprises determining, as a similarity value of the first set of similarity values, a difference between:
a first proportion, of a quantity of users, that have consumed the first content item and a content item of the plurality of other content items, and
a second proportion, of the quantity of users, that have consumed the content item of the plurality of other content items.

7. The method of claim 1, further comprising:
based on the applicability score exceeding a first minimum threshold score, assigning the applicability score to the first metadata tag.

8. The method of claim 7, further comprising:
after determining that the applicability score satisfies a second minimum threshold score, assigning the first metadata tag to a metadata field of the first content item.

9. The method of claim 8, wherein the assigning the first metadata tag to the metadata field of the first content item further comprises:
determining that the metadata field of the first content item is not associated with a metadata tag; and
after assigning the first metadata tag to the metadata field of the first content item, increasing the applicability score by a predetermined value.

10. The method of claim 1, wherein the second set of content items comprises each content item, of the first set of content items, that is associated with the first metadata tag.

11. An apparatus comprising:
one or more processors; and
memory storing instructions that, when executed by the one or more processors, cause the apparatus to:
determine a first set of similarity values indicating levels of similarity between a first content item and a plurality of other content items;
determine, based on the first set of similarity values, a first set of content items, of the plurality of other content items, satisfying a threshold level of similarity to the first content item;
determine a second set of content items, wherein each of the content items of the second set comprises a content item, of the first set of content items, that is associated with a first metadata tag;
generate, based on levels of similarity between the first set of content items and the second set of content items, an applicability score for the first metadata tag and the first content item; and
send, to a user and based on the generated applicability score exceeding a threshold value, a recommendation of the first content item.

12. The apparatus of claim 11, wherein the instructions, when executed by the one or more processors, further cause the apparatus to generate the applicability score by:
determining a second set of similarity values indicating levels of similarity between the first content item and each content item of the first set of content items;
determining a third set of similarity values indicating levels of similarity between the first content item and each content item of the second set of content items; and
determining a first ratio of a sum of the third set of similarity values to a sum of the second set of similarity values.

13. The apparatus of claim 12, wherein the instructions, when executed by the one or more processors, further cause the apparatus to generate the applicability score by:
determining a third set of content items, of the plurality of other content items, associated with the first metadata tag;
determining a second ratio of a number of content items in the third set of content items to a number content items in the second set of content items; and
determining a product of the first ratio and the second ratio.

14. The apparatus of claim 11, wherein the instructions, when executed by the one or more processors, further cause the apparatus to determine the first set of similarity values by:
determining, as a similarity value of the first set of similarity values, a ratio of:
a first proportion, of a quantity of users, that have consumed the first content item and a content item of the plurality of other content items, and
a second proportion, of the quantity of users, that have consumed the content item of the plurality of other content item.

15. The apparatus of claim 11, wherein the instructions, when executed by the one or more processors, further cause the apparatus to determine the first set of similarity values by:

determining, as a similarity value of the first set of similarity values, a difference between:
- a first proportion, of a quantity of users, that have consumed the first content item and a content item of the plurality of other content items, and
- a second proportion, of the quantity of users, that have consumed the content item of the plurality of other content items.

16. One or more non-transitory computer readable media storing instructions that, when executed cause:

determining a first set of similarity values indicating levels of similarity between a first content item and a plurality of other content items;

determining, based on the first set of similarity values, a first set of content items, of the plurality of other content items, satisfying a threshold level of similarity to the first content item;

determining a second set of content items, wherein each of the content items of the second set comprises a content item, of the first set of content items, that is associated with a first metadata tag;

generating, based on levels of similarity between the first set of content items and the second set of content items, an applicability score for the first metadata tag and the first content item; and sending, to a user and based on the generated applicability score exceeding a threshold value, a recommendation of the first content item.

17. The one or more non-transitory computer readable media of claim 16, wherein the instructions, when executed, further cause determining the first set of similarity values by:

determining, as a similarity value of the first set of similarity values, a ratio of:
- a first proportion, of a quantity of users, that have consumed the first content item and a content item of the plurality of other content items, and
- a second proportion, of the quantity of users, that have consumed the content item of the plurality of other content items.

18. The one or more non-transitory computer readable media of claim 16, wherein the instructions, when executed, further cause determining the first set of similarity values by:

determining, as a similarity value of the first set of similarity values, a difference between:
- a first proportion, of a quantity of users, that have consumed the first content item and a content item of the plurality of other content items, and
- a second proportion, of the quantity of users, that have consumed the content item of the plurality of other content items.

19. The one or more non-transitory computer readable media of claim 16, wherein the instructions, when executed, further cause:

based on the applicability score exceeding a first minimum threshold score, assigning the applicability score to the first metadata tag.

20. The one or more non-transitory computer readable media of claim 16, wherein the instructions, when executed, further cause:

after determining that the applicability score satisfies a second minimum threshold score, assigning the first metadata tag to a metadata field of the first content item.

21. The one or more non-transitory computer readable media of claim 20, wherein the instructions, when executed, further cause assigning the first metadata tag to the metadata field of the first content item by:

determining that the metadata field of the first content item is not associated with a metadata tag; and after assigning the first metadata tag to the metadata field of the first content item, increasing the applicability score by a predetermined value.

\* \* \* \* \*

UNITED STATES PATENT AND TRADEMARK OFFICE
CERTIFICATE OF CORRECTION

PATENT NO. : 11,244,017 B2
APPLICATION NO. : 16/218002
DATED : February 8, 2022
INVENTOR(S) : Sayyadi et al.

It is certified that error appears in the above-identified patent and that said Letters Patent is hereby corrected as shown below:

On the Title Page

Column 2, Other Publications, Line 1:
Delete "Juk, 15, 2020EPOPatentAppl17-202-818-5Refused (Year: 2020)." and insert --Jul. 15, 2020 EPO Patent Appl. 17-202-818-5 Refused (Year: 2020).-- therefor Page 3, Column 1, Other Publications, Line 9:
Delete ""Martix" and insert --"Matrix-- therefor Page 3, Column 1, Other Publications, Line 9:
Delete "Llinear" and insert --Linear-- therefor In the Specification Column 5, Detailed Description, Line 23:
Delete "DOC SIS" and insert --DOCSIS-- therefor Column 6, Detailed Description, Line 62:
Delete "P(q p)" and insert --$P(q|p)$-- therefor Column 16, Detailed Description, Line 65 Equation (6):
Delete "$Q=\{q|q|q\epsilon S(p)$ and $q$ is lagged with $t\}$" and insert --$Q = \{q \mid q \in S(p) \text{ and } q \text{ is lagged with } t\}$-- therefor Column 33, Detailed Description, Line 39:
Before "Aliens", insert --"--

Signed and Sealed this
Thirteenth Day of February, 2024

Katherine Kelly Vidal
*Director of the United States Patent and Trademark Office*

CERTIFICATE OF CORRECTION (continued)
U.S. Pat. No. 11,244,017 B2

In the Claims

Column 44, Claim 14, Line 67:
Delete "item." and insert --items.-- therefor